US010942247B2

(12) United States Patent
Sackenreuter et al.

(10) Patent No.: US 10,942,247 B2
(45) Date of Patent: Mar. 9, 2021

(54) WAVEFORM DESIGN FOR LOCATING SYSTEM

(71) Applicant: Fraunhofer-Gesellschaft zur Foerderung der angewandten Forschung e.V., Munich (DE)

(72) Inventors: Benjamin Sackenreuter, Buckenhof (DE); Niels Hadaschik, Munich (DE); Joern Thielecke, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 237 days.

(21) Appl. No.: 16/198,156

(22) Filed: Nov. 21, 2018

(65) Prior Publication Data
US 2019/0094332 A1   Mar. 28, 2019

Related U.S. Application Data

(63) Continuation of application No. PCT/EP2016/061780, filed on May 25, 2016.

(51) Int. Cl.
*G01S 5/06* (2006.01)
*G01S 5/02* (2010.01)
(Continued)

(52) U.S. Cl.
CPC .............. *G01S 5/06* (2013.01); *G01S 5/0226* (2013.01); *G01S 5/14* (2013.01); *G01S 13/74* (2013.01); *G01S 13/878* (2013.01)

(58) Field of Classification Search
CPC . G01S 5/06; G01S 5/14; G01S 5/0226; G01S 5/0252; G01S 5/02; G01S 5/021; G01S 13/74; G01S 13/878; H04W 64/00
(Continued)

(56) References Cited

U.S. PATENT DOCUMENTS 6,243,587 B1 *  6/2001  Dent .......................... G01S 5/06
                                                            342/457
6,275,518 B1 *  8/2001  Takahashi .............. H04B 1/715
                                                            370/321
(Continued)

FOREIGN PATENT DOCUMENTS

DE      102006059623 B3    7/2008
EP          1263255 A2    12/2002
(Continued)

OTHER PUBLICATIONS

Ahmad, Aitzaz et al., "Joint Node Localization and Time-Varying Clock Synchronization in Wireless Sensor Networks", IEEE Transactions on Wireless Communications, Oct. 2013, vol. 12, No. 10.
(Continued)

*Primary Examiner* — Harry K Liu
(74) *Attorney, Agent, or Firm* — Perkins Coie LLP; Michael A. Glenn

(57) ABSTRACT

The invention relates to systems and methods for obtaining phase information and/or localization of tag devices. In particular, the invention relates to a system for the localization of at least one tag device, the system including: the at least one tag device configured to transmit a tag signal which is a frequency-hopping signal; at least one known position device configured to transmit a reference signal; and a localization device configured to localize the at least one tag device based on the phase difference of arrival, PDoA, of the tag signal and the reference signal.

32 Claims, 13 Drawing Sheets

Figure 1:
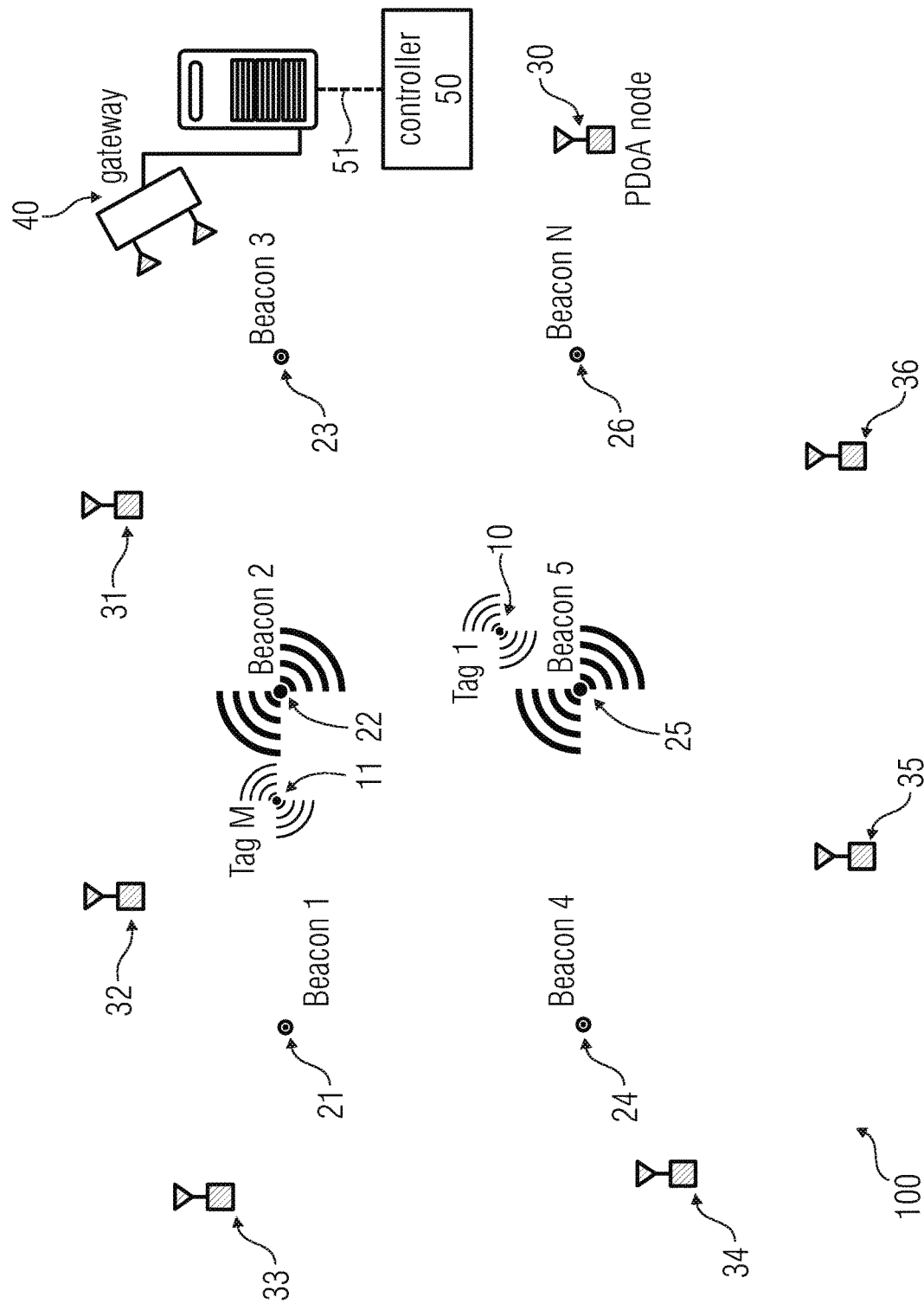

(51) Int. Cl.
*G01S 13/74* (2006.01)
*G01S 13/87* (2006.01)
*G01S 5/14* (2006.01)

(58) Field of Classification Search
USPC .......................................................... 342/451
See application file for complete search history.

(56) References Cited

U.S. PATENT DOCUMENTS

| | | | | |
|---|---|---|---|---|
| 7,397,859 | B2* | 7/2008 | McFarland | H04L 1/0002 |
| | | | | 375/135 |
| 8,233,457 | B1 | 7/2012 | Chen et al. | |
| 8,428,099 | B2* | 4/2013 | Tomokiyo | H04B 1/7156 |
| | | | | 375/133 |
| 8,989,880 | B2* | 3/2015 | Wohl | H04W 4/029 |
| | | | | 700/91 |
| 9,961,495 | B2* | 5/2018 | Katabi | H04W 4/023 |
| 10,462,813 | B2* | 10/2019 | Wager | H04W 72/042 |
| 2004/0061646 | A1* | 4/2004 | Andrews | G01S 5/0036 |
| | | | | 342/463 |
| 2004/0260506 | A1* | 12/2004 | Jones | G01S 1/08 |
| | | | | 702/150 |
| 2010/0328047 | A1* | 12/2010 | Jantunen | G06K 7/10029 |
| | | | | 340/10.4 |
| 2011/0006942 | A1 | 1/2011 | Kluge et al. | |
| 2012/0178473 | A1* | 7/2012 | Wiren | G01S 5/0009 |
| | | | | 455/456.2 |
| 2012/0310395 | A1* | 12/2012 | El-Hoiydi | H04W 48/16 |
| | | | | 700/94 |
| 2014/0378161 | A1 | 12/2014 | Sellier et al. | |
| 2015/0355311 | A1* | 12/2015 | O'Hagan | H04W 4/029 |
| | | | | 340/539.13 |
| 2016/0003932 | A1* | 1/2016 | Whitney | G08B 21/0275 |
| | | | | 342/451 |
| 2016/0295345 | A1* | 10/2016 | Oh | H04W 48/12 |
| 2017/0134935 | A1* | 5/2017 | Wei | H04B 1/713 |
| 2018/0049154 | A1* | 2/2018 | Choi | H04W 76/10 |

FOREIGN PATENT DOCUMENTS

| | | | | |
|---|---|---|---|---|
| EP | 1990928 A1 * | 11/2008 | | H04B 1/7143 |
| WO | 2013020105 A2 | 2/2013 | | |

OTHER PUBLICATIONS

Schneider, Matthias et al., "Localization by Superposing Beats: First Laboratory Experiments and Theoretical Analyzes", IEEE Intern. Conference on Emerging Technologies and Factory Automation, Hamburg/Germany, Sep. 2008, 15-18.

* cited by examiner

WAVEFORM DESIGN FOR LOCATING SYSTEM

CROSS-REFERENCE TO RELATED APPLICATIONS

This application is a continuation of copending International Application No. PCT/EP2016/061780, filed May 25, 2016, which is incorporated herein by reference in its entirety.

1. TECHNICAL FIELD

Embodiments according to the invention create system and methods for the localization of at least one tag device and/or for the acquiring phase differences between wireless signals.

In particular, embodiments of the invention refer to a reference transmitter selection and waveform design for a locating system.

2. BACKGROUND OF THE INVENTION

Accurate localization (e.g., for the Internet-of-Things, IoT) is needed for many use cases, e.g. asset tracking, in particular in indoor environments.

However, this is not easily possible for several reasons, e.g., for high bandwidth requirements. For example, several elements could need to transmit data at the same time, hence increasing the likelihood of interferences between signals, near-far problems, multipath, etc.

Current time delay based locating systems (see U.S. Pat. No. 8,233,457 B1, [1]) comprise fixed anchor nodes at known position and tags at unknown position involve an anchor network to be synchronized in some way (unless RTT ranging among the tag and all anchor nodes is performed). If this operation is carried out wirelessly, some kind of reference transmitter is usually needed. The first step towards position determination of the tag is relating a signal burst transmitted by the reference to a signal burst transmitted by the tag.

However, these systems need high signal bandwidth, needed for sufficient temporal resolution of the burst.

Further, a relatively stable crystal oscillator is needed, to relate packets transmitted/received at different instances in time.

Beside Time of Arrival measurements based on the envelope of wideband signals, carrier phase measurements can be utilized for positioning.

Measurements are in general impaired by errors. A phase error may propagate as a position error. In general terms, some incorrect phase measurements are due to an unknown clock bias of a transmitting device. Other phase errors are due to the clock of one of the receivers. other phase errors are implied by multipath and obstacles. Some phase errors are independent from the frequency of the transmitted signal. Hence, reliability of measurements is not optimal.

Further, reliability is not optimal also for other reasons. High differences in RSS (Received Signal Strength) between reference transmitter and tag (near-far effect) can cause a bad determination of the positions: the signal transmitted by a closer device can hide the signal transmitted by the more distant device.

Further, the periodic transmission from one or multiple reference transmitters may occupy considerable parts of the radio resource. High energy consumption is often needed to provide accurate localization. In some cases, this contradicts the idea of IoT devices, which need to be running on a single battery for multiple years.

US 20110006942 A1 discloses a system consisting of two nodes (an initiator and a reflector) is used, where phase measurements are performed in a round-trip like manner.

Reference [2] discloses a system which analyzes location dependent interference patterns of two superimposed signals. This is based on transmissions of amplitude modulated signals.

DE102006059623 B3 also discloses the superposition of two signals with two transmitters in a known location and a moving receiver. The intermodulation pattern is exploited for localization.

U.S. Pat. No. 8,233,457 B1 discloses a system which is mainly related to IEEE 802.11. US 20140378161 A1 does not consider the use of reference transmitters.

3. SUMMARY

According to an embodiment, a system for the localization of at least one tag device may have: the at least one tag device configured to transmit a tag signal; at least one known position device configured to transmit a reference signal; and a localization device configured to localize the at least one tag device based on the phase difference of arrival, PDoA, of the tag signal and the reference signal, wherein at least one of the tag signal and the reference signal is a frequency-hopping signal.

According to another embodiment, a system for the localization of at least one tag device may have: the at least one tag device configured to transmit a tag signal; at least one known position device configured to transmit a reference signal; and a localization device configured to localize the at least one tag device, wherein the system is configured so as to associate the at least one tag device to one of the at least one known position device on the basis of distance determinations between the at least one tag device and each of the of known position devices.

According to another embodiment, a method for acquiring a phase difference between a first wireless and a second wireless signals using at least a first and a second PDoA receivers, wherein at least one of the first and second signals is subdivided into a first time slot and a second time slot at different frequencies, may have the steps of: calculating first phase differences; calculating second phase differences as a differences between two first phase differences; and calculating third phase differences as differences between two second phase differences, wherein one of said phase differences is performed between values associated to different wireless signals; another one of said phase differences is performed between values associated to different PDoA receivers; another one of said phase differences is performed between values associated to different time slots.

According to another embodiment, a method for localizing at least one tag device using the method for acquiring a phase difference between a first wireless and a second wireless signals using at least a first and a second PDoA receivers, wherein at least one of the first and second signals is subdivided into a first time slot and a second time slot at different frequencies, may have the steps of: calculating first phase differences; calculating second phase differences as a differences between two first phase differences; and calculating third phase differences as differences between two second phase differences, wherein one of said phase differences is performed between values associated to different wireless signals; another one of said phase differences is performed between values associated to different PDoA receivers; another one of said phase differences is performed between values associated to different time slots, wherein the first wireless signal is transmitted by the tag device and the second wireless signal is transmitted by a known position device, further including deriving the position of the at least one tag device on the basis of the third phase difference.

According to another embodiment, a method for localizing at least one tag device may have the steps of: transmitting, by the tag device, a tag signal; transmitting, by at least one known position device, a reference signal; and deriving the position of the at least one tag device on the basis of the phase difference of arrival, PDoA, of the tag signal and the reference signal, wherein at least one of the tag signal and the reference signal is a frequency-hopping signal.

According to another embodiment, a method for localizing at least one tag device in a system having a plurality of known position devices may have the steps of: associating the at least one tag device to one of the at least one known position device on the basis of distance determinations between the at least one tag device and each of the of known position devices; transmitting a tag signal from the at least one tag device; transmitting a reference signal from at least one known position device configured to; and deriving the position of the at least one tag device on the basis of the tag signal and the reference signal.

Another embodiment may have non-transitory digital storage medium having a computer program stored thereon to perform the method for acquiring a phase difference between a first wireless and a second wireless signals using at least a first and a second PDoA receivers, wherein at least one of the first and second signals is subdivided into a first time slot and a second time slot at different frequencies, the method having the steps of: calculating first phase differences; calculating second phase differences as a differences between two first phase differences; and calculating third phase differences as differences between two second phase differences, wherein one of said phase differences is performed between values associated to different wireless signals; another one of said phase differences is performed between values associated to different PDoA receivers; another one of said phase differences is performed between values associated to different time slots, when said computer program is run by a computer.

Another embodiment may have a non-transitory digital storage medium having a computer program stored thereon to perform the method for localizing at least one tag device using the method for acquiring a phase difference between a first wireless and a second wireless signals using at least a first and a second PDoA receivers, wherein at least one of the first and second signals is subdivided into a first time slot and a second time slot at different frequencies, the method having the steps of: calculating first phase differences; calculating second phase differences as a differences between two first phase differences; and calculating third phase differences as differences between two second phase differences, wherein one of said phase differences is performed between values associated to different wireless signals; another one of said phase differences is performed between values associated to different PDoA receivers; another one of said phase differences is performed between values associated to different time slots, wherein the first wireless signal is transmitted by the tag device and the second wireless signal is transmitted by a known position device, further including deriving the position of the at least one tag device on the basis of the third phase difference, when said computer program is run by a computer.

Another embodiment may have a non-transitory digital storage medium having a computer program stored thereon to perform the method for localizing at least one tag device, the method having the steps of: transmitting, by the tag device, a tag signal; transmitting, by at least one known position device, a reference signal; and deriving the position of the at least one tag device on the basis of the phase difference of arrival, PDoA, of the tag signal and the reference signal, wherein at least one of the tag signal and the reference signal is a frequency-hopping signal, when said computer program is run by a computer.

Another embodiment may have a non-transitory digital storage medium having a computer program stored thereon to perform the method for localizing at least one tag device in a system having a plurality of known position devices, the method having the steps of: associating the at least one tag device to one of the at least one known position device on the basis of distance determinations between the at least one tag device and each of the of known position devices; transmitting a tag signal from the at least one tag device; transmitting a reference signal from at least one known position device configured to; and deriving the position of the at least one tag device on the basis of the tag signal and the reference signal, when said computer program is run by a computer.

The present invention relates to a system for the localization of at least one tag device, the system comprising:

the at least one tag device configured to transmit a tag signal;

at least one known position device configured to transmit a reference signal; and a localization device configured to localize the at least one tag based on the phase difference of arrival, PDoA, of the tag frequency-hopping signal and the reference signal, wherein at least one of the tag signal and the reference signal is a frequency-hopping signal.

With the invention, bandwidth requirements are more relaxed, at least on the receiving device. When multiple tags transmit frequency-hopping signals, less interference between signals is implied. Different pairs (tag device/known position device) can use different hopping patterns to allow for concurrent measurements at the localization device.

Moreover, reliability is increased: by comparing the tag signal and the reference signal at different frequencies, it is possible to obtain more dependable measurements. For example, phase errors which are introduced at some determinate frequencies may be cancelled by multiple comparisons at different frequencies. Also the impact of fading effects is different on different frequencies: therefore, by operating at different frequencies, better measurements are obtainable.

According to an aspect of the invention, there is provided a system for the localization of at least one tag device, the system comprising:

the at least one tag device configured to transmit a tag signal;

a plurality of known position devices, each configured to transmit a reference signal; and a localization device configured to localize the at least one tag device (which in some embodiments may be based on the phase difference of arrival, PDoA, of the tag signal and the reference signal, and in other embodiments may be another kind of receiver), wherein the system is configured so as to associate the at least one tag device to one of the plurality of known position devices as a known position device which is within a particular distance threshold, or which appears to be the closest, as a result of a preliminary distance determination and/or a previous distance determination.

According to an aspect of the invention, the at least one known position device transmits a signal at at least one frequency which is the same or within a predetermined threshold from one of the frequencies of the tag signal (which can be a frequency-hopping signal). For example, the at least one known position device may transmit the same (or a very similar) signal, e.g., a hopping signal with the same frequency or a frequency which only slightly differs from the frequency of the tag signal (which can be a frequency-hopping signal).

It has been noted that, accordingly, the phase information of the signals can be determined more easily and with increased reliability.

As the tag and the known position device operate at the same (or almost the same) frequencies or the same frequency bands, they only occupy the same time/frequency resources.

Hence, the invention increases the number of simultaneous transmissions.

According to an aspect of the invention, one of the at least one known position device and the at least one tag transmits a multicarrier signal, and the other device modifies the frequency of its signals (e.g., using a frequency-hopping scheme) to permit a comparison between each carrier and each segment (during each time slot) of the other signal.

Accordingly, the need of hardware resources is reduced.

According to an aspect of the invention, the tag signal and the reference signal overlap at least partially (in particular, the reference signal can be a copy, or at least a partial copy, of the tag signal).

An easier determination of the phase information of the signals is therefore possible.

In some embodiments, one of the tag device and the known position device can try to copy the signal (or the carrier, or one of the carriers or at least transmit at the same frequency band) transmitted by the other device and transmit it (or a signal with the same or a similar carrier, or one of or a similar to one of the carriers, or at least transmit at the same or similar frequency band). For example, the known position device may detect the frequency of the tag signal and adapt the frequency of its own signal to the tag signal.

In other embodiments, the tag device may adapt the frequency of the tag signal to the frequency of the known position device. The latter possibility is particularly advantageous when the known position device is an arbitrary device (in particular a device transmitting multicarrier signals), and the tag device (e.g., after having detected the frequencies of the signal transmitted by the known position device) adapts the frequencies of the tag signal to the frequencies of the signal transmitted by the known position device.

In some embodiments, the tag device (e.g., frequency hopping tag device) and the known position device (e.g., multicarrier known position device) may operate in the same frequency band, e.g. 2.4 GHz WLAN, for example on channel 1.

In some embodiments, the tag device does not need to precisely copy the multicarrier signal. For some kinds of signals, which could comprise WiFi signals (which may be employed with the present invention), it is possible to provide that all (or almost all, or the majority of, or at least a relevant part of) the subcarriers are utilized and thus there will be a subcarrier that lies close to the frequency hopping signal of the tag. According to an embodiment, the tag device could determine the most heavily utilized WIFI Band utilized by the known position device and transmit the hopping signal in this band. According to a variant, it is the known position device which already transmits WiFi signals, and the tag device adapts its carrier to the most heavily utilized WIFI Band.

In some embodiments, it is possible to provide an adaptation of the frequency steps to the WiFi subcarrier-spacing. In other embodiments, a similar result could be obtained without adaptation, e.g., on the basis of prior knowledge such as data stored in the memory of the tag device and/or known position device (or even in a master node, such as the gateway).

According to an aspect of the invention, the at least one known position device is configured to transmit a reference signal at the reception of a signal transmitted by the at least one tag device.

In some embodiments, the known position device transmits signals (occupying a channel) only on demand.

Accordingly, the known positions devices do not necessarily need to periodically transmit signals, if no signals is received from a tag device. Hence, radio resources are not wasted by useless transmissions. Further, energy consumption (implied by the transmissions) is reduced. Further, time errors between different clocks are also less dangerous, as they do not accumulate.

According to an aspect of the invention, at least one among the at least one tag device and the at least one known position device is a wake-up node.

Accordingly, the use of wake-up nodes permits to reduce energy consumption without sacrificing quality.

According to an aspect of the invention, the at least one tag device comprises a plurality of tag devices and/or the at least one known position device comprises a plurality of known position devices.

With a plurality of known position devices, the at least one tag device may (in some examples) be configured to be associated to one of the plurality of known position devices. By associating the tag devices with the known positions devices, it is possible to obtain pairs (tag device/known position device) of devices transmitting signals so as to calculate the phase information.

With a plurality of tag devices, the at least one known position device may (in some examples) be configured to be associated to one of the plurality of tag devices.

According to an aspect of the invention, the at least one tag device is configured to determine the associated known position device as a known position device which is within a particular distance threshold, or which appears to be the closest, as a result of a preliminary distance determination and/or a previous distance determination.

The known position device can be, for example, dynamically selected by the tag device, e.g., on the basis of distance measurements (e.g. RTT measurements), multiple AoA measurements, or RSSI measurements, or the like.

By associating a tag device with the closest (or at least one of the closest) known position device, it is advantageously possible to mitigate the inconvenient caused by the near-far effect, e.g. when the tag device and the known position device transmit simultaneously. Also the number of PDoA measurement devices that is able to receive both the tag and the known position device signals will be maximized.

According to one embodiment, the known position device transmits reference signals which include their ID (identifier) in a periodic or triggered (e.g. by the gateway) manner, so that the tag devices are able to perform measurements (RSS, RTT, AoA, etc.) and as a result are able to determine the closest known position device. The mentioned ID can be used to at least one of the two following results:
a) Derive a hopping pattern;
b) Derive a wake-up sequence to trigger reference signal transmission later on.

According to some embodiments, a tag device can get assigned a reference transmitter by a server, e.g, based on the aforementioned measurements.

According to some embodiments, the at least one known position device is configured to determine the associated tag device as a tag device which is within a particular distance threshold, or which appears to be the closest, as a result of a preliminary distance determination and/or a previous distance determination.

According to an aspect of the invention, a plurality of known position devices is configured to transmit reference signals at different frequencies.

Accordingly, interferences between different tag devices and/or known position devices are reduced.

It is also possible, for each tag device and/or known position device, to hop frequency according to a particular fashion, e.g., using a predefined sequence, a predetermined sequence, a random sequence, pseudorandom sequence, or a sequence adapted to an external command. The sequence may follow a particular algorithm, which can also be based on data relating to the devices (e.g., a serial number of the device) which are not (or not easily) repeated throughout the group of devices. In some embodiments, the hopping sequence may be derived from an ID of closest known position device. Hence, it may be guaranteed that the group of devices hop frequency so as to minimize interferences and similar impairments.

According to an aspect of the invention, the localization device comprises a plurality of PDoA receivers distributed in different locations.

The localization device can comprise a controller device which can determine the position of the tag devices. The controller can also be remote (e.g., connected through a network, e.g., internet or another geographical network), or partially remote and partially local (e.g., formed by at least a remote processor and a local processor, both the processors being linked to each other by communication means).

According to an aspect of the invention, a superposition of signals or more concurrent receive signals can be used for location determination by (but not limited to):
analyzing the intermodulation products after applying the two signals to a nonlinearity;
analyzing the individual signals (separated by an initially unknown frequency offset/shift) after sampling in the digital domain.

According to one aspect of the invention, a frequency-hopping signal (transmitted by the tag device and/or the known position device) can be:

$$s[k] = \sum_{n=0}^{N} \exp\left(+j\omega_{step}\left(n - \left\lfloor \frac{N}{2} \right\rfloor\right)(k - nL)\right) rect\left[\frac{k - (n + 0.5)L}{L}\right]$$

where L is the number of samples per subcarrier, k is the time-instance and N is the number of subcarriers. The rect(.) function can be defined by $$rect\left[\frac{k}{L}\right] = \begin{cases} 1 & \text{if } -\frac{L}{2} < k \leq \frac{L}{2} \\ 0 & \text{else} \end{cases}$$

The known position devices can form a so-called beacons system (each of the known position devices may be intended as a beacon).

According to one aspect, at least one of the tag device and the known position device is a wake-up device, and its transmission is triggered by the reception of the preamble of a signal transmitted by another device. According to one aspect, the preamble contains the identifier of the other device. According to one aspect, the identifier is obtained during a preliminary and/or previous procedure According to an aspect of the invention, there is provided a method for acquiring a phase difference between a first wireless and a second wireless signals using at least a first and a second PDoA receivers, wherein at least one of the first and second signals is subdivided into a first time slot and a second time slot at different frequencies, the method comprising: calculating first phase differences; calculating second phase differences as a differences between two first phase differences; and calculating third phase differences as differences between two second phase differences, wherein one of said phase differences is performed between values associated to different wireless signals; another one of said phase differences is performed between values associated to different PDoA receivers; and another one of said phase differences is performed between values associated to different time slots.

Accordingly, it is possible to tolerate several phase errors (such as phase errors that would be introduced by the clocks).

According to an aspect of the invention, the method may provide, for each time slot and for each PDoA receiver: a first phase difference between the first signal and the second signal;
for each time slot, calculating a second phase difference as the difference between the first phase difference at the first PDoA receiver and the first phase difference at the second PDoA receiver; calculating a third phase difference as a difference between the second phase difference of the first time slot and the second phase difference of the second time slot.

According to an aspect of the invention, there is provided a method for localizing at least one tag device using the method, wherein the first wireless signal is transmitted by the tag device and the second wireless signal is transmitted by a known position device, further comprising deriving the position of the at least one tag device on the basis of the third phase difference.

According to an aspect of the invention, there is provided a method for localizing at least one tag device, the method comprising: transmitting, by the tag device, a tag signal, by at least one known position device, a reference signal; and deriving the position of the at least one tag device on the basis of the phase difference of arrival, PDoA, of the tag signal and the reference signal, wherein at least one of the tag signal and the reference signal is a frequency-hopping signal.

According to an aspect of the invention, there is provided a method for localizing at least one tag device in a system comprising a plurality of known position devices, the method comprising: associating the at least one tag device one of the at least one known position device (on the basis of distance determinations between the at least one tag device (and each of the of known position devices; transmitting a tag signal from the at least one tag device; transmitting a reference signal from at least one known position device configured to; and deriving the position of the at least one tag device (for example, on the basis of the phase difference of arrival, PDoA, of the tag signal and the reference signal).

The invention also relates to a non-transitory memory comprising a computer-readable code that, when executed by at least a processor, causes the processor to control the methods disclosed in the present document.

The invention also relates to a tag device configured to carry out one of the methods of the invention (e.g., in combination with one or other components of the inventive system).

The invention also relates to a known position device configured to carry out one of the methods of the invention (e.g., in combination with one or other components of the inventive system).

For example, the invention also relates to a PDoA receiver and/or a localization device configured to carry out one of the methods of the invention (e.g., in combination with one or other components of the inventive system).

For example the localization device (which can comprise a plurality of PDoA receivers, and/or a controller, and/or a gateway) may be configured to:
- calculate first phase differences;
- calculate second phase differences as differences between two first phase differences; and
- calculate third phase differences as differences between two second phase differences,
  wherein one of said phase differences is performed between a value associated to a tag signal and a value associated to a reference signal;
  another one of said phase differences is performed between values associated to different PDoA receivers (31-36);
  another one of said phase differences is performed between values associated to different time slots.

Embodiments of the invention permit a position determination of tags via dynamically selected reference transmitter and PDoA measurements, e.g., performed at dedicated measurements devices (e.g., PDoA receivers). An inventive system can comprise a set of tags at unknown location, one or multiple gateways for the establishment of a communication link between the tags and the outside world, network reference transmitter nodes (e.g., known position devices) a set of receivers at known location for PDoA estimation. Main ideas of the invention may be related to the use of a procedure of reference transmission selection to mitigate near-far effect, non-orthogonal channel access of tag and reference transmitter, relation between the waveform of the tag and waveform of the reference transmitter, low complexity receiver for phase estimation, triggered transmission of reference signals (e.g., to save radio resources).

4. BRIEF DESCRIPTION OF THE FIGURES

Figure 2:
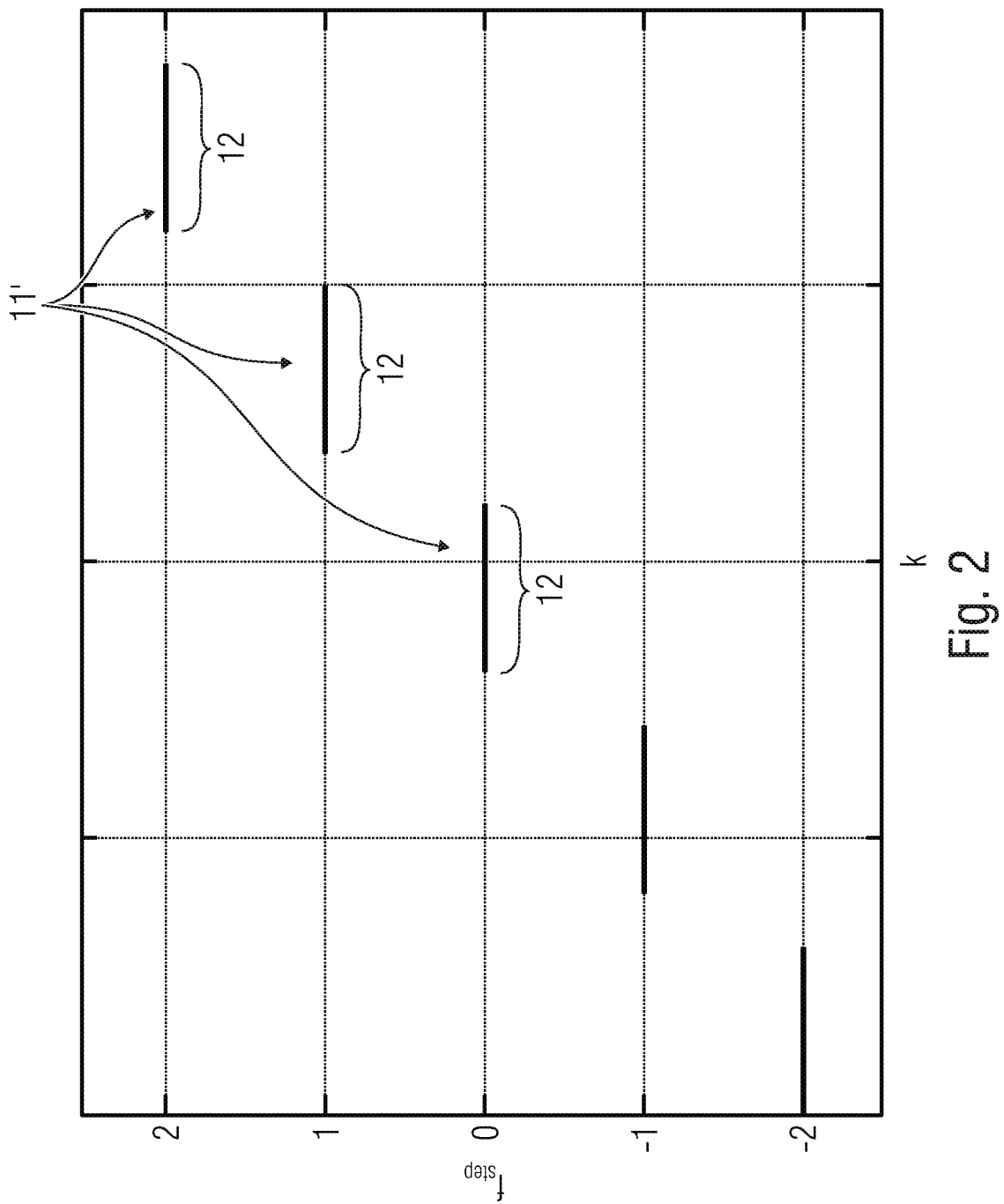
Figure 3:
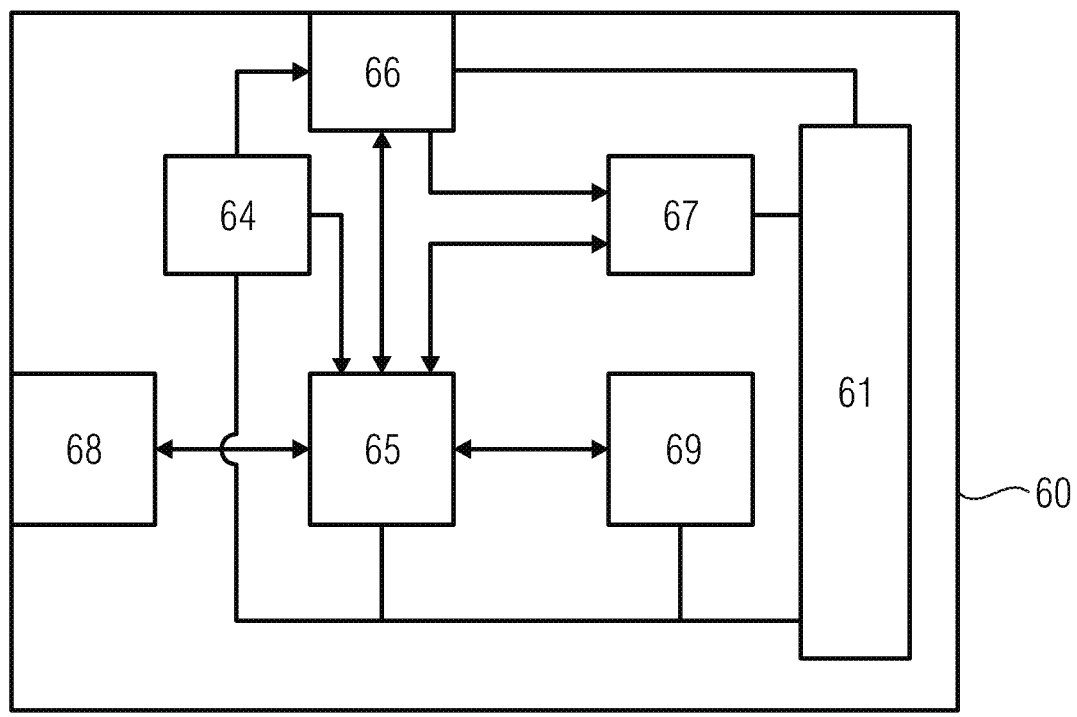
Figure 4:
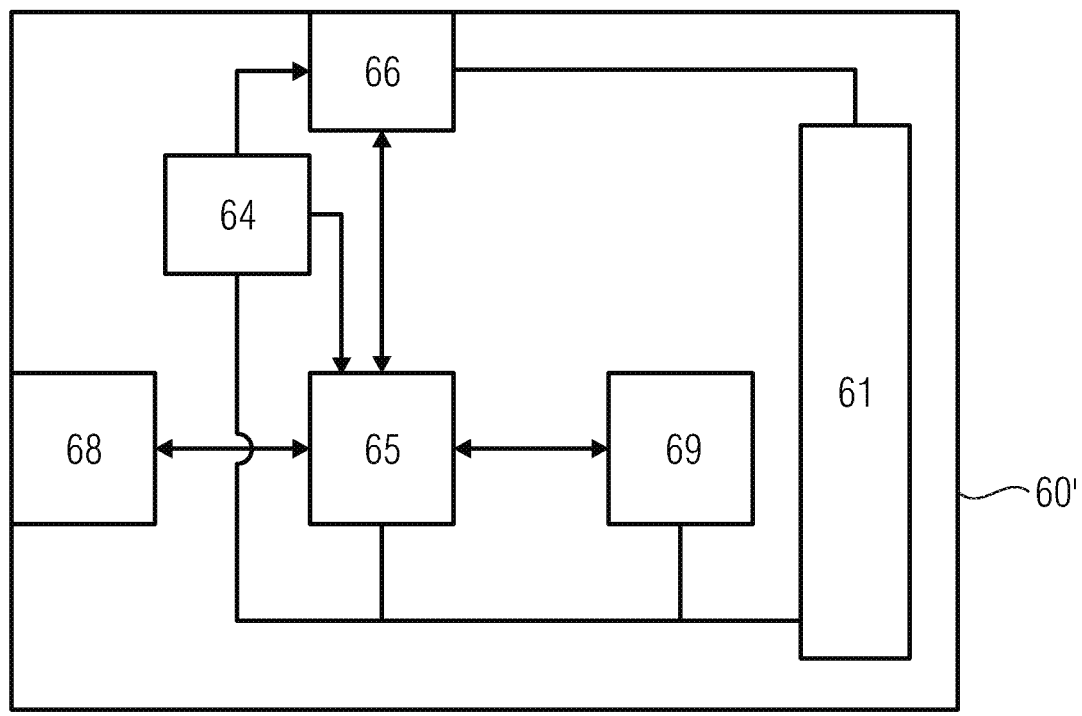
Figure 5:
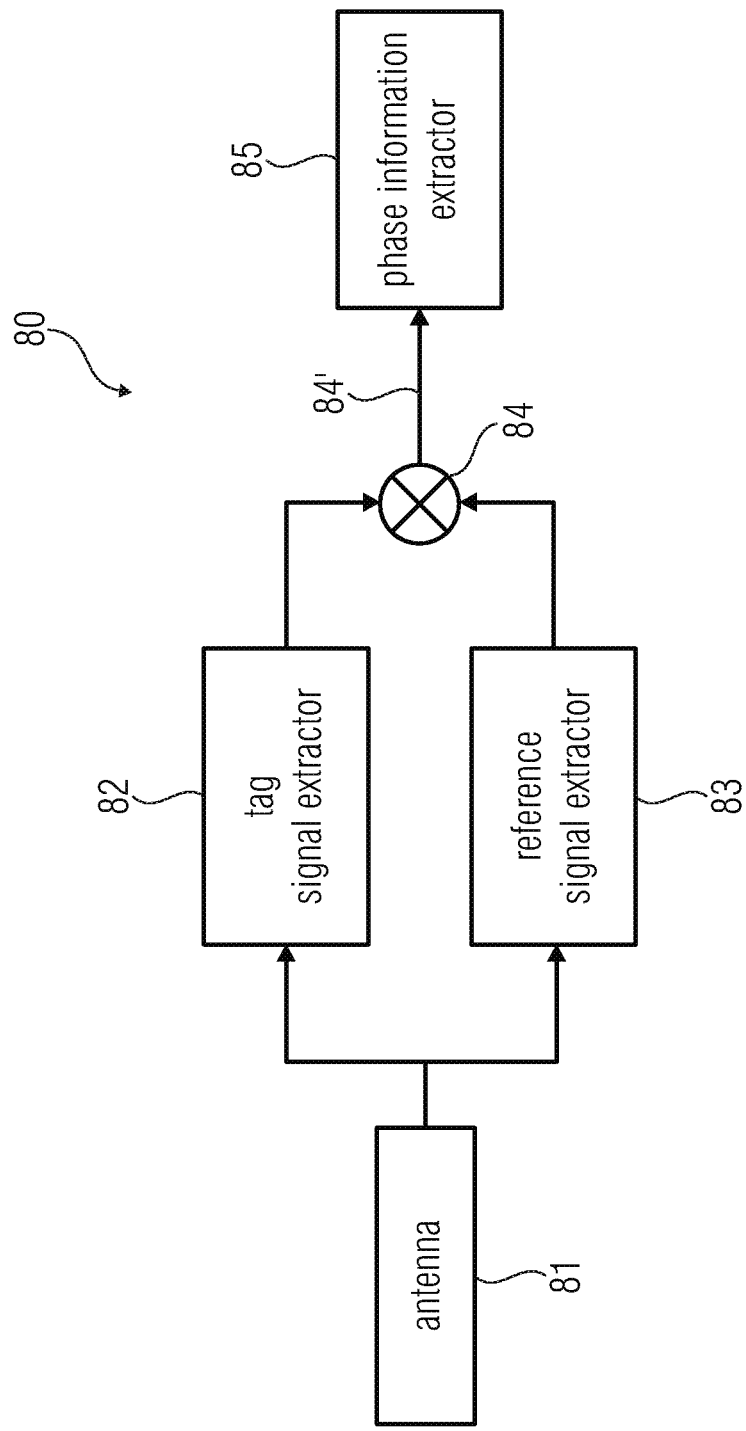
Figure 6:
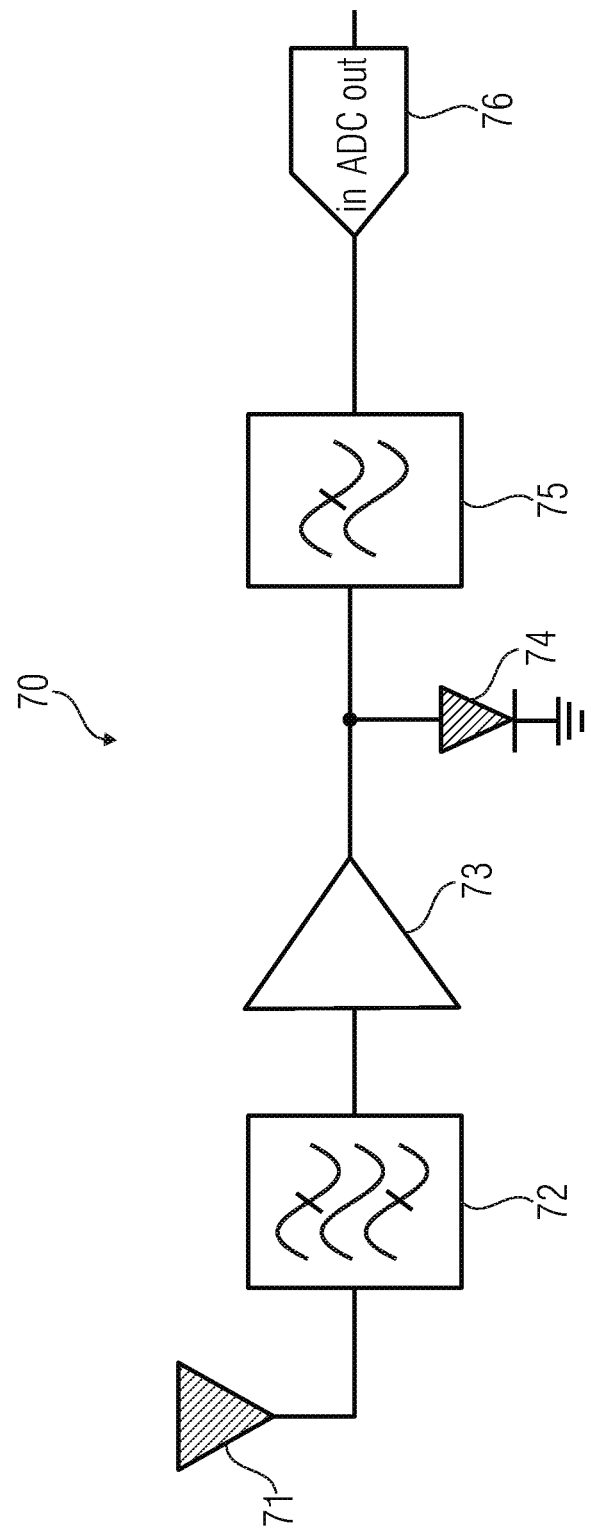
Figure 7:
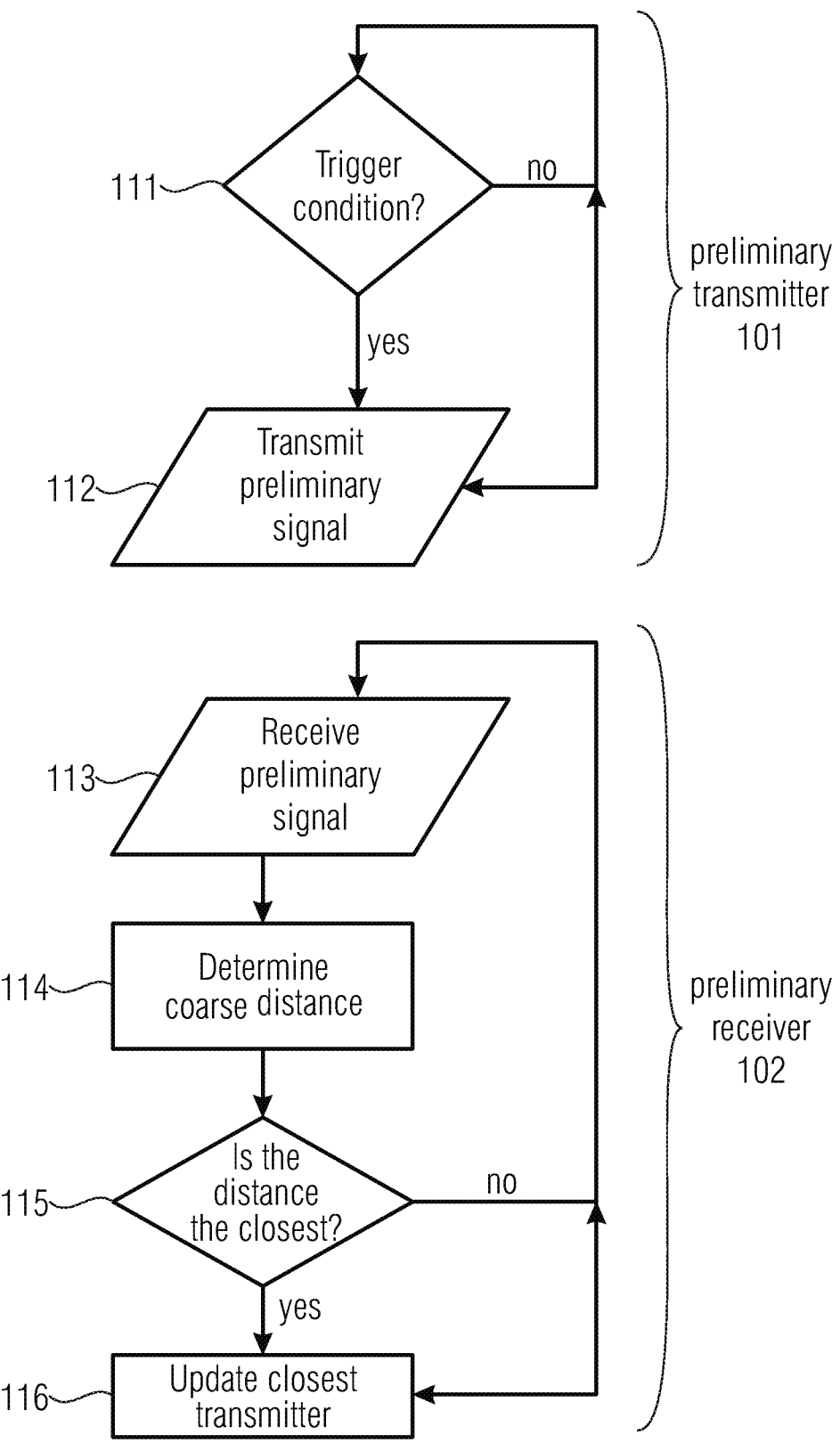
Figure 8:
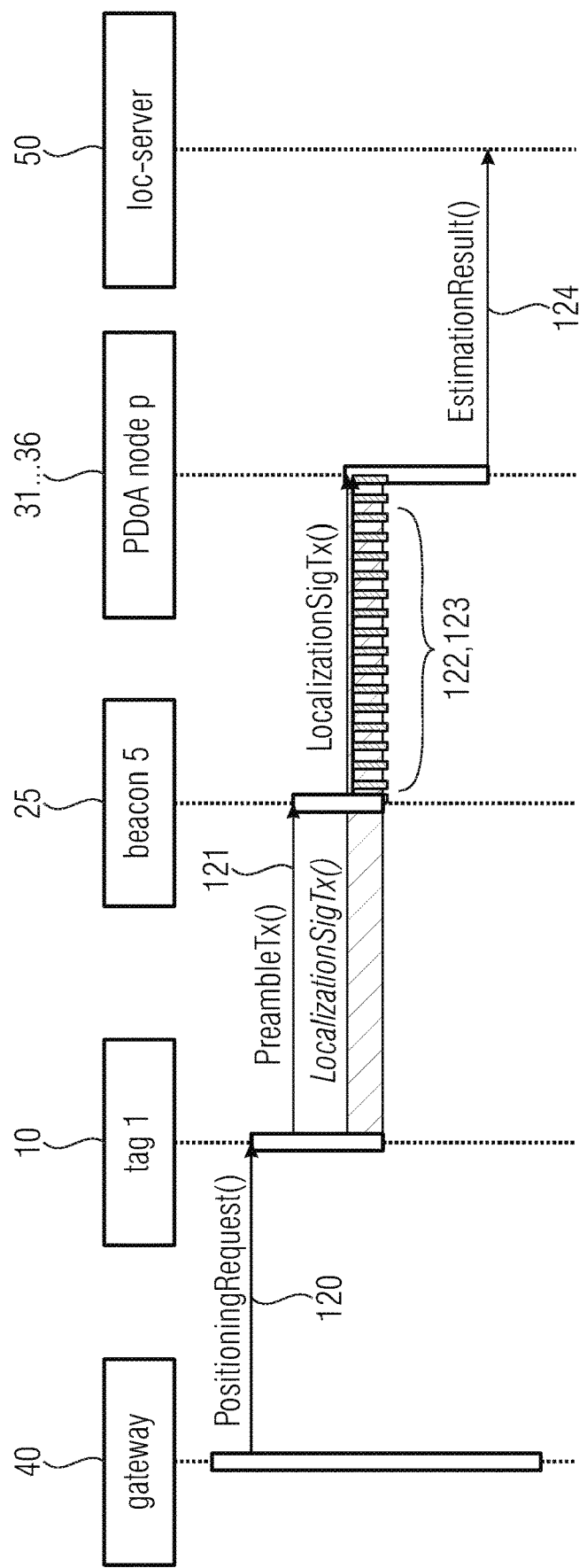
Figure 9:
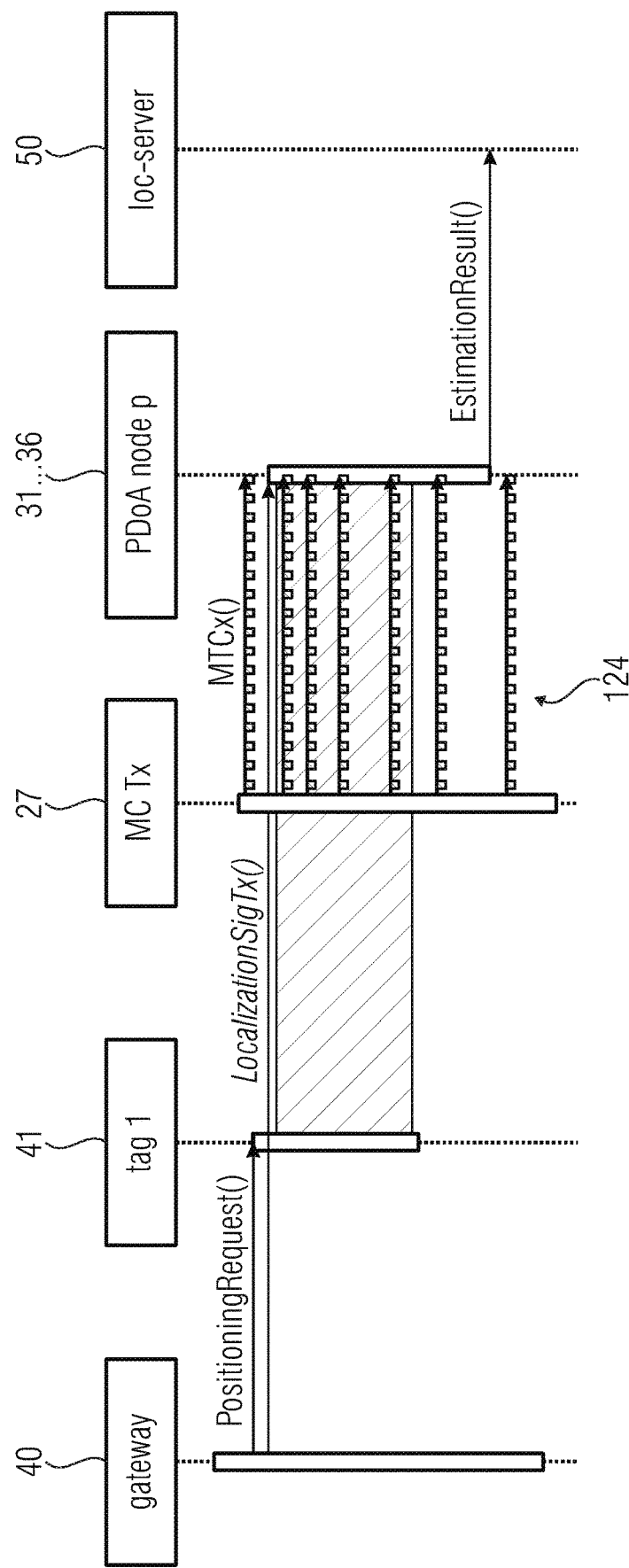
Figure 10:
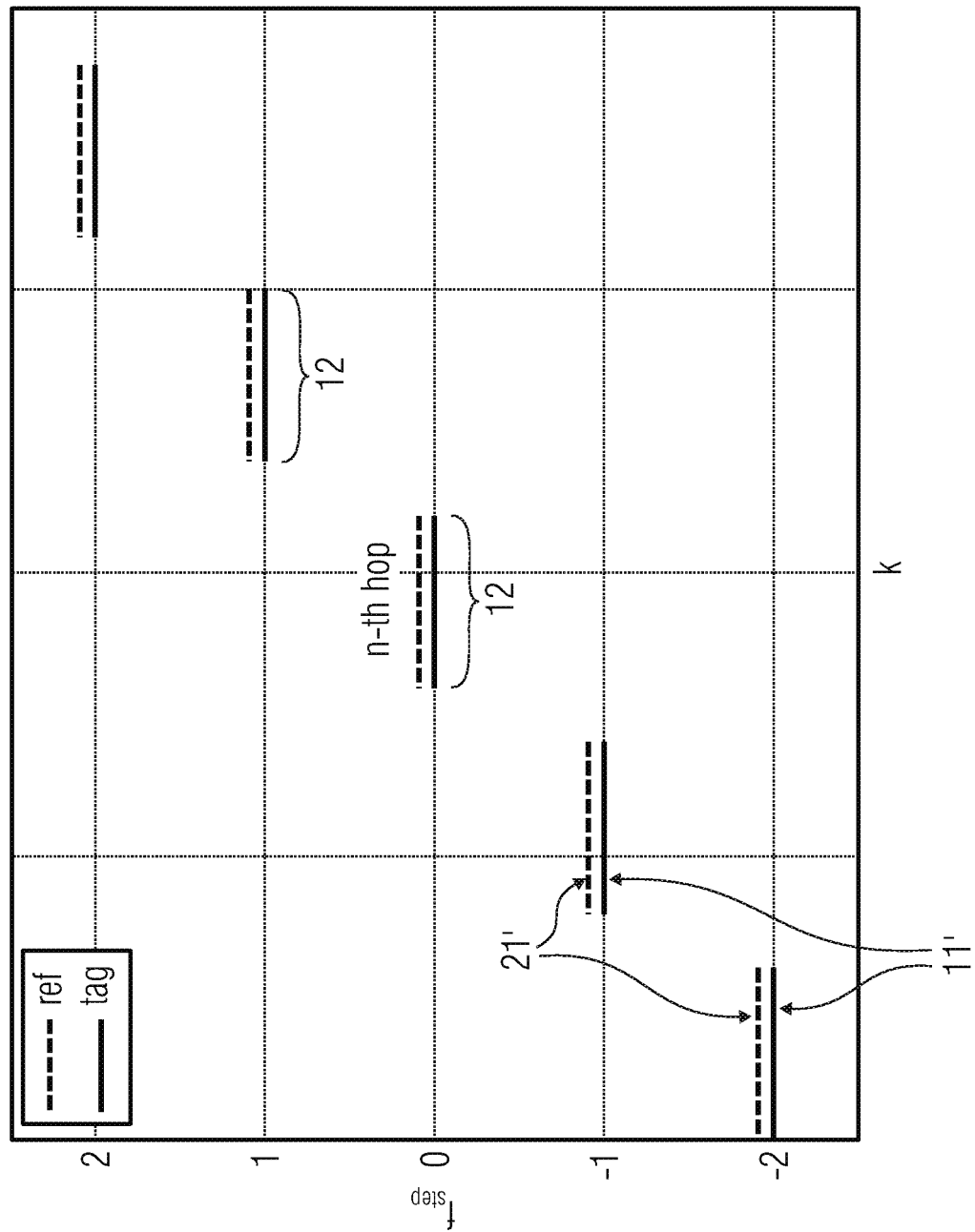
Figure 11:
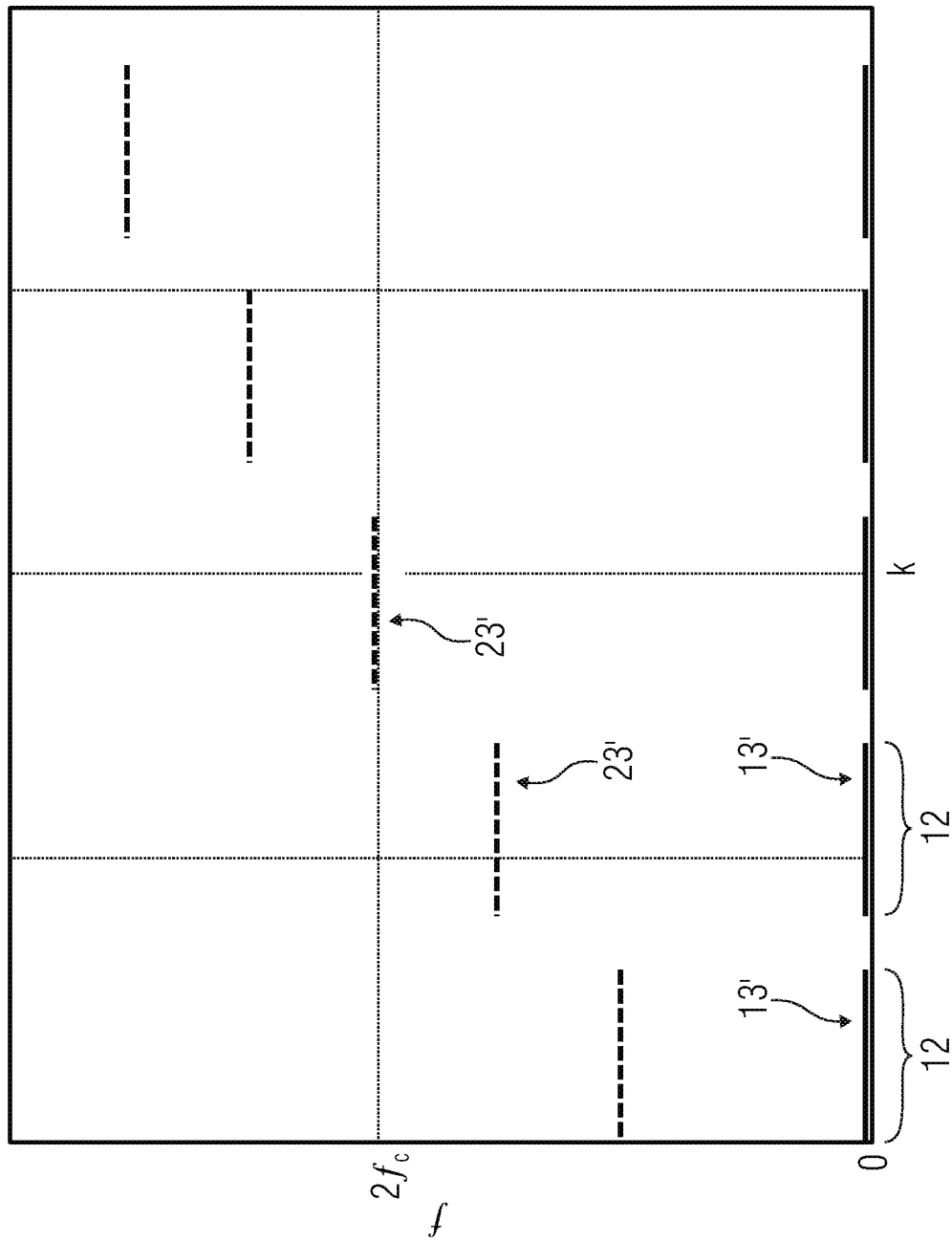
Figure 12:
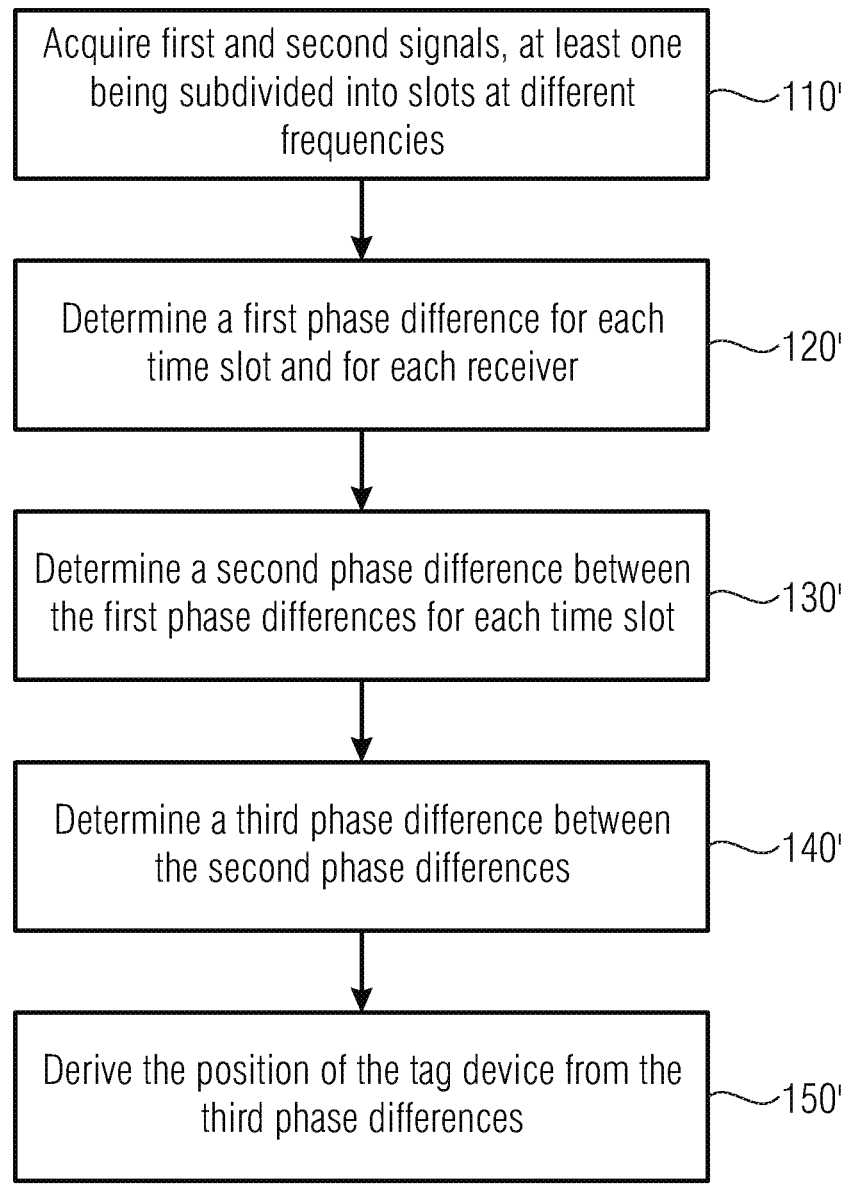
Figure 13:
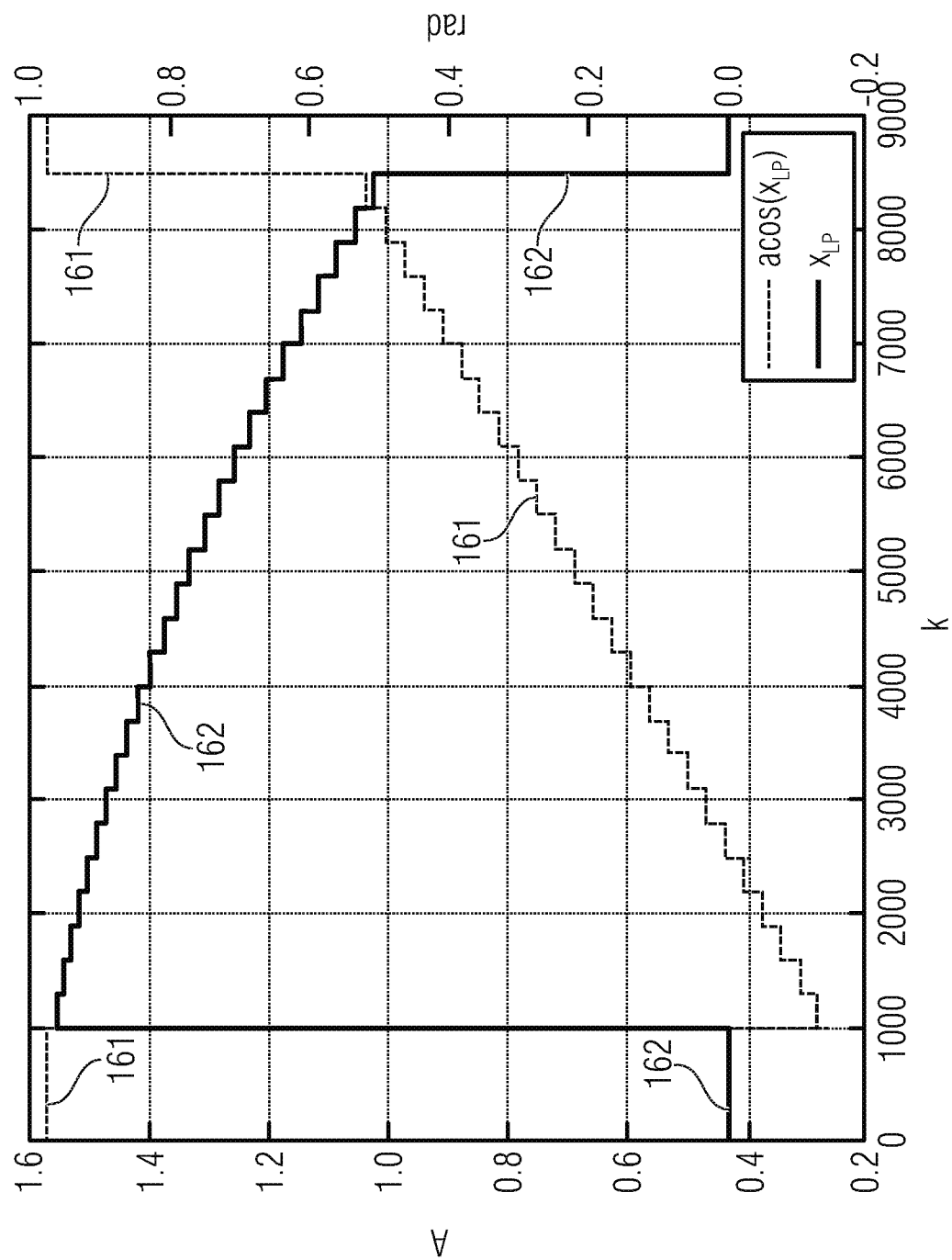
Figure 14:
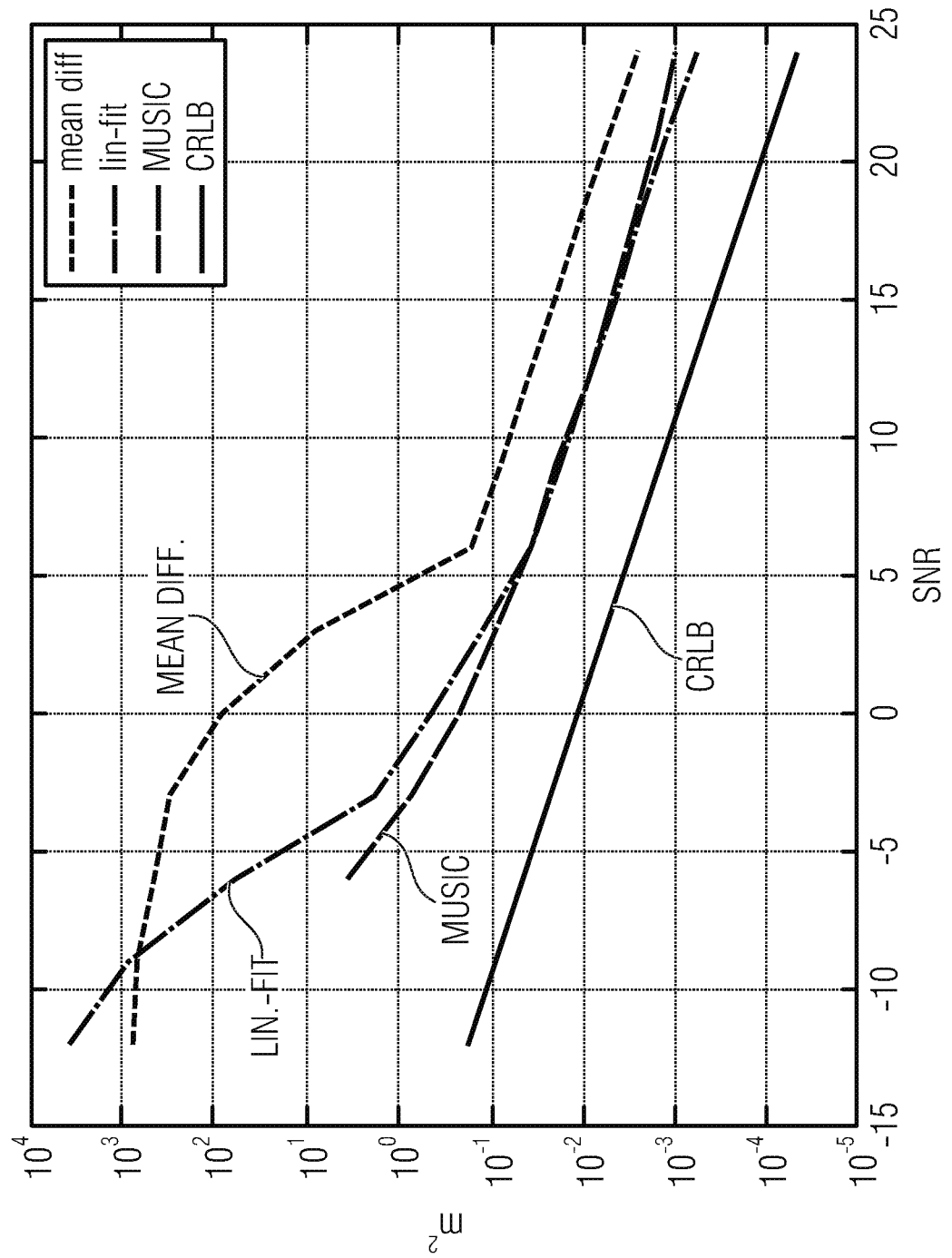

Embodiments of the present invention will be detailed subsequently referring to the appended drawings, in which:
FIG. 1 shows a system according to the invention;
FIG. 2 shows frequency hops which can be employed with the invention;
FIG. 3 shows a hardware a part of an embodiment the invention;
FIG. 4 shows a hardware a part of an embodiment the invention;
FIG. 5 shows a part of an embodiment the invention;
FIG. 6 shows a part of an embodiment the invention;
FIG. 7 shows a method according to an embodiment the invention;
FIG. 8 shows a method according to an embodiment the invention;
FIG. 9 shows a method according to an embodiment the invention;
FIG. 10 shows frequency hops which can be employed with the invention;
FIG. 11 shows an output of the device of FIG. 6;
FIG. 12 shows a method according to an embodiment the invention;
FIG. 13-14 show results of embodiments of the invention.

5. DETAILED DESCRIPTION OF THE INVENTION

Hereinafter, embodiments and parts of the invention are discussed.

5.1. The Network of FIG. 1

FIG. 1 shows a system 100 for the localization of at least one tag device (here, "Tag 1", referred to with 10, and "Tag M", referred to with 11). The system 100 can comprise the tag devices 10 and 11, whose position is to be determined. The system 100 can also comprise known position devices (here "Beacon 1-N", being referred to with 21-26), whose position is known. The system 100 can also comprise a localization device configured to localize the tag devices 10 and 11. The localization device (which is in this case a distributed device with several distinct units displaced in different places) can comprise a plurality of (e.g., at least three) receivers 30-36 (which can be PDoA receivers) which permit to calculate the position of the tag devices 10 and 11 by analysing the phase information of signals transmitted by devices 10 and 11 and known position devices 21-26.

According to an aspect of the invention:
- a tag device 10 or 11 transmits a tag signal (which can be a frequency-hopping signal);
- at least one known position device (in this case, known position devices 22 and 25) transmits a reference signal (e.g., at least partially overlapping the tag signal);
- the receivers (such as PDoA receivers 30-36) cooperate to determine the position of the tag device (e.g., on the basis of the phase information of the signals).

Accordingly, it is possible to calculate the position of the tag devices 10 and 11, e.g., based on the phase information (e.g., phase difference of arrival, PDoA) of the tag signal (which can be a frequency-hopping signal) and the reference signal transmitted by the known position devices (in this case devices 22 and 25).

In some embodiments, the tag device 11 may be associated to the known position device 22 and the tag device 10 may be associated to the known position device 25 during a wireless preliminary coarse localization procedure. For example, each tag device may receive preliminary signals from the different known position devices 21-26 and may determine the closest device (e.g., by determining the signal strengths of preliminary signals transmitted by the different known position devices during the preliminary coarse localization procedure).

In some embodiments, the tag devices 10 and 11 may receive a positioning request message (e.g., through a wireless signal), for example from the localization device or one of its components, such as a gateway 40. The device which sends the positioning request message may operate as a master which commands the transmissions of the frequency-hopping signals to the tag devices 10 and 11.

The tag devices 10 and 11 may wirelessly transmit the tag signals (e.g., at least partially overlapping the tag signals). For example, the known position devices 22 and 25 may, in turn (e.g., triggered by the tag signals), wirelessly transmit reference signals. In some embodiments, the known position devices 21-26 may be wake-up devices: in that case, devices 22 and 25 wake up when they detect at least a part of the tag signals transmitted by the tag devices 10 and 11, while the remaining devices 21, 23, 24, and 26 may continue being non-operative (or partially operative, for example, without participating to the localization).

The receivers (e.g., PDoA receivers) 30-36 may determine information (e.g., phase information) on the signals transmitted by the tag devices 10 and 11 and by the known position devices 25 and 22.

Using the information (e.g., phase information) obtained by the receivers 30-36, the controller 50 may calculate the position of the tag devices 10 and 11.

5.2. The Frequency-Hopping Signal

The frequency-hopping signal (transmitted by the tag devices 10 and 11 and/or the known position devices 25 and 22, respectively) may be any kind of frequency-hopping signal.

In one embodiment, the frequency-hopping signal is a stepped frequency sweep signal. An example of frequency-hopping signal can be represented by a formula such as:

$$s[k] = \sum_{n=0}^{N} \exp\left(+j\omega_{step}\left(n - \left\lfloor\frac{N}{2}\right\rfloor\right)(k - nL)\right) rect\left[\frac{k - (n + 0.5)L}{L}\right]$$

where L is the number of samples per subcarrier, k is the time instant and N is the number of subcarriers. $\omega_{step}$ can be $2\pi f_{step}$, where $f_{step}$ is shown as 11' in FIG. 2 (k indicating time instants). The rect(.) function can be defined by:

$$rect\left[\frac{k}{L}\right] = \begin{cases} 1 & \text{if } -\frac{L}{2} < k \leq \frac{L}{2} \\ 0 & \text{else} \end{cases}$$

As can be seen from FIG. 2, the signal may be subdivided into different time slots 12. The rect(.) function may represent the temporal window for a tone.

An advantage of such a signal lies is its simplicity (if generated by an energy efficient device). No digital modulation is needed. Instead, a single phase locked loop with a channel spacing of $f_{step}$ is sufficient. Hopping only to the next adjacent step also greatly reduces settling times of the loop and, thus, reduces an involved guard interval.

However, the invention is not limited to stepped frequency sweep signals, but can be used in combination with any frequency hopping signal.

A frequency-hopping signal may be transmitted by a tag device 10 or 11. The tag signal (which can be a frequency-hopping signal) may address a particular known position device 21-26 (for example, the known position device to which the tag device has been associated, e.g., during a preliminary coarse localization session). The tag signal (which can be a frequency-hopping signal) may contain a preamble, which may encode information relating to the addressed known position device (if the known position device is a wake-up device, the preamble can cause the known position device to wake up). The preamble of the tag signal may also not be frequency-hopping. In some cases, the preamble may be at a fixed (or known a priori) frequency.

In other embodiments, the frequency-hopping signal is transmitted by a known position device (the properties of the tag device and the known position device defined above being exchangeable).

In some embodiments, a frequency-hopping signal is transmitted by a known position device and the tag device. In some examples, the signals transmitted by both the devices are substantially similar (e.g., in the same frequency band and/or with a frequency difference which is below a predetermined threshold).

In other embodiments, the frequencies of the signals are predefined (e.g., without necessity of detecting the frequency transmitted by the other device). In general, the frequencies may be hopped according to a sequence, which can be predetermined, predefined, random, pseudorandom, controlled by an external command (e.g., an order by a master node), based on non-repeatable (or non-easily-repeatable) values (e.g., the serial number of one of the devices), or the like.

In one embodiment, the invention uses standard compliant signals such as WiFi, Bluetooth, LTE. In an office environment, WiFi is probably unavoidable. The invention may be based on adapting tag signals and/or known position devices to particular frequencies and/or frequency bands, such as 2.4 GHz and a 80 MHz total hopping bandwidth.

According to some embodiments, one of the two devices (tag and known position device) may follow the signal transmitted by the other device and adapt its frequency to the frequency thereto.

In some embodiments, the pattern of the frequency-hopping signal is modified on the basis of values such as an identifier of a device (e.g, the ID of a preliminary transmitter during a preliminary coarse localization procedure).

5.3. Hardware Components

Examples of hardware components that may be used to implement at least some of the tag devices 10 and 11, known position devices 21-26, receivers (e.g., PDoA receivers) 30-36, gateway 40, and controller 50 are provided in FIGS. 3 and 4.

A hardware component 60 (FIG. 3) or 60' (FIG. 4) may comprise a transmitter/receiver 66 (e.g., comprising or associated to an antenna) connected to a processor 65. The processor 65 can control circuitry, such as a (transitory and/or non-transitory) memory 69. The processor 65 can also control input/output means 68 (e.g., a port and/or a connection, such as wired connection, towards external devices, for linking the device to a external network, for example during off-line sessions). A clock 64 may provide time information to the processor 65 and/or the transmitter/receiver 66.

A power supply 61 may supply energy to the various components (e.g., components 65, 68, 69). In some embodiments, the power supply 61 may contain an energy storage means, such as a battery. Alternatively or additionally, the power supply 61 may contain connections to an external power source, such as the mains.

In FIGS. 3 and 4, arrows indicate logical connections, and lines without arrows indicate power supply connections.

If the hardware component 60 (FIG. 3) embodies a wake-up device, the components 65, 68, 69 may be normally non-operating (e.g., in an energy-save mode). A wake-up controller 67 may be provided to continuously operate by controlling the signals received by the transmitter/receiver 66. Following the instructions provided to the wake-up controller 67, when a predetermined signal is received the wake-up controller 67 may force the processor 65 (and, in case, also at least one of the other components 68 and 69) to restart operations. As the power consumption is mostly limited to the wake-up controller 67, the clock 64, and the transmitter/receiver 66, energy consumption can be advantageously reduced.

If the hardware component 60 embodies a tag device (10 or 11), the wake-up controller 67 may be configured to perform a wake-up operation at the reception of a particular signal, e.g. from the gateway 40 (when provided) to trigger the transmission of the frequency-hopping signal. Alternatively or additionally, the wake-up controller 67 may be configured to perform a wake-up operation at the reception of a preliminary signal transmitted by one of the known position devices 21-26, e.g., to trigger a preliminary coarse localization procedure.

If the hardware component 60 embodies one of the known position devices 21-26, the wake-up controller 67 may be configured to perform a wake-up operation at the reception of (at least a part of) a signal from the frequency-hopping signal (e.g., the signal transmitted by the associated tag), e.g. to trigger the transmission of a reference signal. For example, a preamble of the tag signal may be used to wake up the known position device.

If the hardware component 60 embodies one of the receivers 30-36 (e.g., PDoA receivers), the wake-up controller 67 may be configured to perform a wake-up operation at the reception of (at least a part of) the signals from the tag devices 10 or 11 and/or the position devices 21-26, e.g., to initiate a phase determination.

Alternatively or additionally, the wake-up device 60 may also be commanded by an external entity, such as the controller 50.

Alternatively to the wake-up device 60, the hardware component 60' (FIG. 4) is not a wake-up device; component 67 may be omitted (the transmit/receive functions are directly controlled by the controller 65).

Some of the devices of the system 100 may be wake-up devices and some may be non-wake-up devices. In particular, some or all of the known position devices 21-26 may be wake-up devices 60 (they may be waken up at the reception of the preamble of the frequency-hopping signal, for example), while some or all of the receivers (e.g., PDoA receivers 30-36) may be non-wake-up devices 60'.

It is intended that the structures of devices 60 and 60' refer to general outlines of the hardware. When one of the devices 60 or 60' embodies a tag device 10 or 11, suitable components (e.g., to embody the power supply 61) shall be chosen. Further, the device 60 or 60' shall perform a specific function (e.g., the function of a tag device is not the same function of a receiver/PDoA receivers) and the needed routines (which may be different from the routines for performing different functions) shall be stored in the memory 69.

5.4. Tag Devices

Tag devices (e.g., 10, 11) are devices to be localized, and can be mobile, movable, and/or transportable devices and/or devices engageable to mobile, movable, and/or transportable entities. Tag devices may be engaged, glued, structurally connected and/or incorporated to physical entities whose position is to be determined. Tag devices may comprise or be inserted in housings endowed with the needed connection means for association to physical entities. They can also be connected to human or animal parts, clothes, or garments, or similar objects. Housings can contain additional elements, such as setting means, buttons such as ON-OFF buttons, and so on. Housings can also provide structural properties, such as, in some cases, water-proof and/or water-repellent properties, and so on. Tag devices may be wake-up devices (for example embodied, at least partially, by device 60) or non-wake-up devices (for example embodied, at least partially, by device 60'). The power supply 61 for the tag devices may be embodied by storage means, such as batteries and/or capacitors.

A tag device (e.g., 10, 11) may transmit a tag signal (which can be a frequency-hopping signal). In some embodiments, the signal is transmitted periodically; in some other embodiments, the signal is transmitted non-periodically. The tag signal (which can be a frequency-hopping signal) may address a specific known position device, so as to participate to the localization (e.g., PDoA localization) of the tag device.

In some embodiments, the tag device transmits the tag signal (which can be a frequency-hopping signal) at the reception of a request signal transmitted by a master node (e.g., gateway 40). Additionally or alternatively, the tag device may also receive data and information from a remote node (master node and/or gateway).

In some embodiments, the tag device may be associated to one of the known position devices, for example during a preliminary coarse localization procedure. For example the tag device may be configured to determine the closest (or the apparently closest) between the known position devices relying on a technique such as RSS (Received Signal Strength). It is also possible to use distance measurements (e.g. RTT measurements), and/or multiple AoA measurements. The tag device and the associated known position device may therefore form a pair of devices both transmitting signals for the subsequent fine localization of the tag device (relying, for example, on a PDoA technique). The information of the closest fixed portion device may be saved, for example in a register (e.g., a part of the memory 69 of the tag device). This information (which may include, for example, the identifier of the known position device and/or a wake-up sequence needed to wake it up) may be modified, e.g. in real-time, when (e.g., during subsequent coarse localization procedures) the closest known position device is changed. In one embodiment, the identifier may be used by the tag device to derive a wakeup-sequence (for example, from a set of predefined sequences).

Accordingly, the preamble of the tag signal (which can be a frequency-hopping signal) may be determined dynamically: the preamble addresses only the (at least apparently closest) known position device which participate to the same pair of the tag device.

5.5. Known Position Devices (Fixed Position Devices)

Known position devices (e.g., 21-26) are devices whose position is already determined, so as to permit the localization of the tag devices.

In some embodiments, the known position devices may be engaged, glued, structurally connected and/or incorporated to physical entities whose position is already determined. They may be part of an entity known as beacons system. They may comprise or be inserted in housings endowed with the needed connection means for association to physical entities. Housings can contain additional elements, such as setting means, buttons such as ON-OFF buttons, and so on. Housings can also provide structural properties, such as, in some cases, water-proof and/or water-repellent properties, and so on. Known position devices may be wake-up devices (for example embodied, at least partially, by device 60). The power supply 61 for the known position devices may be embodied by storage means, such as batteries and/or capacitors, or by suitable connections to external power sources.

The relative position between the known position devices may be fixed. The relative position of each of them may also be fixed with respect to the PDoA receivers 31-36. In some cases, the known position devices may be engaged/disengaged and/or transported (in particular, in off-line operations, such as set-up operations). During set-up sessions, their position may be detected (e.g., by PDoA receivers 31-36 or other positioning means) and stored in memory means.

Each known position device may transmit a signal (which may be a frequency-hopping single) overlapping (at least partially) the signal (which may be a frequency-hopping signal) transmitted by a tag device. Accordingly, these signals are to be detected by at least some of the receivers 31-36 to permit the calculation of the position of the tag device (e.g., by the controller 50).

According to embodiments, a known position device may transmit a signal (and in some embodiments even waken up) at the reception of a tag signal (which can be a frequency-hopping signal) from a tag device (e.g., a tag device associated thereto in the same pair). In particular the preamble of the tag signal (which can be a frequency-hopping signal) may contain an identifier (and/or a wake-up sequence) of the particular known position device, so as to trigger the transmission of a signal to be overlapped to the tag signal (which can be a frequency-hopping signal) for the determination (e.g., the determination of the PDoA).

According to at least one embodiment, it is not needed, for the known position device, to be aware in real-time of the identity of the associated tag device. This information may be simply obtained when the preamble of the frequency-hopping signal is obtained. In other embodiments, the known position device may be aware in real-time of the associated tag device: for example, such an information may be communicated by a master node (such as the gateway 40) and saved in a register (e.g., a part of the memory 69 of the known position device).

In some embodiments, during preliminary localization procedures (which can be, for example, coarse localization procedures), the known position devices may transmit preliminary signals that are intended to be received by the tag devices (which may at least grossly determine the closest known position device, e.g., using RSS, AOA, RTT, or other similar techniques). In the preliminary signals, data encoding information of the identifier of the specific known position device and/or information such as the wake-up sequence of the specific known position device can be provided, so that a tag device (if determining that the specific known position device is the closest among the plurality of the known position devices) may save the encoded information and use it subsequently when transmitting the signal (which could be a frequency-hopping signal).

Upon request (e.g., from a tag device or from a master node, such as the gateway 40), the known position devices may transmit special reference signals. A special reference signal may contain a particular preamble which allows for preliminary coarse localization procedures.

In embodiments in which the known position devices transmit reference signals on demand (e.g, when triggered by the reception of a signal from the tag device), there is an advantageous reduction of transmissions: the measurements (e.g., the PDoA measurements) are not disturbed by noise introduced by reference signals transmitted by unpaired known position devices.

In some embodiments it is also possible to configure the known position devices and the tag devices (and/or other devices such as a master node, if present) so that the transmissions of the reference signals and tag signals do not overlap with other transmissions, such as, for example, preliminary transmissions for the coarse localization procedure, or other transmissions. In some embodiments, it is possible to arrive at such result, for example, by implementing time-triggered solutions, commands from masters, algorithms based on time (even absolute item) of transmissions, and so on.

According to one embodiment, at least some of the known position devices are connected in a network (such as a wireless or a wired network, such as a LAN) and may be connected to a central node (which can also be the controller 50) and/or to the receivers 31-36 and/or the gateway 40. In some embodiments, the known position devices are autonomic. In alternative embodiments, they are remotely controlled (for example from the controller 50). In some embodiments, they transmit data to each others, for example for deciding which known position device is entitled to transmit data and/or during the coarse preliminary procedure to cooperate to determine the pairs with the tag devices.

5.6. Localization Device

The localization device operates to obtain the position of the tag devices. PDoA measurements can be used. Other embodiments may make use of different measurements (hereinafter, reference is made to PDoA receivers, even if in some embodiments they could be substituted by other kinds of receivers).

Elements and embodiments of the localization device are herewith discussed. The localization device may be a distributed device. The localization device may comprise receivers (e.g., 31-36) and a controller device (which can be controller 50). In some embodiments, a master node and/or a gateway (e.g., gateway 40) may be provided.

5.6.1. Receivers (e.g., PDoA Receivers)

The receivers (e.g., 31-36) are devices whose position is known. In particular, PDoA receivers are advantageous. In some embodiments, however, other kinds of receiver may be used.

The receivers may be engaged, glued, structurally connected and/or incorporated to physical entities whose position is already determined. They may be part of an entity known as beacons system (the beacons system also comprising known position devices 21-26 and a controller 50). They may comprise or be inserted in housings endowed with the needed connection means for association to physical entities. Housings can contain additional elements, such as setting means, buttons such as ON-OFF buttons, and so on. Housings can also provide structural properties, such as, in some cases, water-proof and/or water-repellent properties, and so on. The receivers may be non-wake-up devices (for example embodied, at least partially, by device 60'). The power supply 61 for the receivers may be embodied by connection to external power sources, such as the mains. The receivers may be connected to each other in a (wired, wireless or mixed wired-wireless) network, e.g., via the input/output means 68. The network of receivers can be connected to a (local or remote) controller (e.g., controller 50), e.g., via network 51.

The data obtained by the receivers may be transmitted to the controller 50 to calculate the positions of the tag devices 10 and/or 11.

In operation, receivers 31-36 may receive signals from the tag devices and the known position devices. For example, a receiver could receive the signals from the pair formed by tag device 11 and known position device 22. Phase information may be therefore obtained and transmitted to the controller 50. All (or at least a group of receivers) do the same operation for the same signals transmitted by the same pair substantially at the same time. Therefore, the controller 50 may derive the position of the tag device on the basis of the detections performed by multiple receivers. At least three (advantageously four) receivers may be used to localized one tag device in one instant.

5.6.1.1. A Mixing Scheme for a PDoA Receiver

A scheme for a PDoA receiver 80 (for example, implementing a wideband receiver) is provided in FIG. 5. The PDoA receiver 80 comprises an antenna 81 which converts electromagnetic waves into electric magnitudes (which can also be encoded in digital values). The PDoA receiver 80 may comprise a tag signal extractor 82 (capable of isolating the tag signal, which can be a frequency-hopping signal, transmitted by a tag device 10 or 11) and a reference signal extractor 83 (capable of isolating the signal, or a part thereof, transmitted by a known position device 31-36). The PDoA receiver 80 may comprise a mixer 84 (which could also embodied by a circuitry such as the mixing diode circuitry 70, see below) to obtain a mixed signal 84'. The mixed signal 84' contains phase information which is extracted by a phase information extractor 85.

5.6.1.2. A Mixing Diode Circuitry for a PDoA Receiver

According to an embodiment, a PDoA receiver 31-36 (and/or its transmitter/receiver 66) can comprise a mixing diode circuitry, which identified by numeral 70 shown in FIG. 6.

The mixing diode circuitry 70 comprises an antenna 71, e.g., to receive signals such as the frequency-hopping signal (antenna 71 may embody antenna 81). The circuitry 70 may comprise a bandpass (e.g., a narrow bandpass) filter 72 to be tuned to a particular frequency. The circuitry 70 may comprise an amplifier 73. The circuitry 70 may comprise a diode 74 (which can have a grounded cathode). The circuitry 70 may comprise a lowpass filter 75. The circuitry 70 may also comprise an output 76, which can provide an electrical output which contains valuable information, such as, for example, information of phase differences between the signal transmitted by the tag device 11 and the signal transmitted by the known position device 22.

Basically, the antenna 71 can provide a voltage $v_{INPUT}$ which is (or at least approximates) a sum of the voltage $v_{TAG}$ that would be provided by the tag signal alone and the voltage $v_{REFERENCE}$ that would be provided by the reference signal alone.

5.6.2. The Gateway

A gateway 40 can also be provided. It can be, for example, one of the distributed devices of the localization device. In one embodiment, the gateway 40 is also one of the receivers 31-36 (which can be PDoA receivers). Additionally and/or alternatively, the gateway 40 can also be embodied by the controller 50. The gateway 40 may also be connected to the network of receivers (which can be PDoA receivers) and/or a network connecting to a (local or removing) controller (e.g., controller 50).

The gateway 40 may be fixed, mobile, and/or transportable. It can be engaged, glued, structurally connected and/or incorporated to physical entities. It can be part of an entity known as beacon system. It may comprise or be inserted in housings endowed with the needed connection means for association to physical entities. Housings can contain additional elements, such as setting means, buttons such as ON-OFF buttons, and so on. Housings can also provide structural properties, such as, in some cases, water-proof and/or water-repellent properties, and so on. The gateway 40 can also be embodied, at least partially, by a device such as device 60. The power supply 61 for the known position devices may be embodied by suitable connections to external power sources.

According to some embodiments, the gateway 40 may transmit a request which is received by the tag devices 10 and 11 to trigger the transmission of the tag signals.

According to some embodiments, the gateway 40 may also transmit a request which is received by the tag devices (in some alternative embodiments by the known position devices) to initiate a preliminary coarse localization procedure.

According to some embodiments, the gateway 40 may also transmit information to the tag devices. For example, the gateway 40 could encode information relating to the known position devices (between 31-36) which is closest to each of the tag devices 10 and 11 (to let the tag device to save in a register, e.g., of the memory 69, the identifier of and/or the wake-up sequence for the closest known position devices).

According to some embodiments, information (e.g., phase information) from the receivers 31-36 may be routed by the gateway 40 to the (remote or local) controller 50.

5.6.3. The Controller

A (local or remote) controller 50 can also be provided. It can be, for example, embodied by one of the distributed devices of the localization device. In one embodiment, the controller 50 is also one of the receivers 31-36 (which can be PDoA receivers). Additionally and/or alternatively, the gateway 40 can also embody the controller 50. The controller 50 may also be connected to the network of receivers and/or a network connecting to a gateway. The controller 50 can also be a PC and/or a server and connected to peripherals, such as input/output means (display, keyboard, mouse, and so on).

5.7. The Preliminary Coarse Localization Procedure

According to one aspect of the invention, there is provided the following method:
- each of the known position devices 21-26 transmits a preliminary signal (in some embodiments simultaneously, in some embodiments non-simultaneously);
- each of the tag devices 10 and 11 receives the preliminary signals;
- each of the tag devices determines its closest known position device.

According to alternative embodiments, there is provided the following method:
- each of the tag devices 10 and 11 transmits a preliminary signal (in some embodiments simultaneously, in some embodiments non-simultaneously);
- each of the known position devices 21-26 receives the preliminary signals;
- each of the known position devices determines its closest tag device.

According to one embodiment, the transmission of the preliminary signal is time triggered (e.g., periodically). According to another embodiment, the transmission of the preliminary signal follows a random scheme.

According to an embodiment, the transmission of the preliminary signal is triggered by a signal, e.g., from a master device. The master device, according to embodiments, could be chosen from one of the tag devices, the gateway, one of the plurality of known position devices. In particular when the master device is chosen from a plurality of similar devices (e.g., tag devices, known position devices, non-PDoA receivers and/or PDoA receivers) an algorithm may be defined so as to elect the master device or to choose it on the basis of deterministic criteria, such as the serial number of the device.

The preliminary coarse localization procedure may be based on RSS (other possibilities are, for example, multiple AoA measurements and RTT measurements). At the end of this procedure, the tag devices are associated to known position devices. This information may be obtained by the receiver of the preliminary signal. In embodiments in which the preliminary receiver is the tag device (after having received preliminary signals from the known position devices and determined the closest known position device), the information may be stored in a memory of the tag device. In embodiments in which the preliminary receiver is the known position device (after having received preliminary signals from the tag devices and determined the closest tag device), the information may be stored in a memory of the known position device.

FIG. 7 shows an example of the method. A preliminary transmitter 101 (tag device or known position device) may wait at step 111 for a trigger condition to be fulfilled (the trigger condition may be a message from a master note, a timer being expired, or other conditions). At the trigger condition being verified, a preliminary message may be transmitted at step 112 to preliminary receivers 102 (which are known position devices if the preliminary transmitter is a tag device, and tag devices if the preliminary transmitter is a known position device). Therefore, step 111 can be restarted.

At step 113, each of the preliminary receivers 102 (which are known position devices if the preliminary transmitter is a tag device, and tag devices if the preliminary transmitter is a known position device) may receive the preliminary signal. At step 114, each of the preliminary receivers 102 may grossly determine a distance from the preliminary transmitter 101. At step 115, each of the preliminary receivers 102 may compare the distance value associated to the preliminary transmitter 101 with other distance values saved in a memory (e.g., a vector in which each field relates to a particular preliminary transmitter). If the comparison is positive (in the sense that the preliminary transmitter is recognized as the closest to the preliminary receiver), the information of the closest preliminary transmitter is updated at step 116: a new pair is formed between the preliminary transmitter 101 and the preliminary receiver 102. Step 116 is skipped when the preliminary transmitter is not recognized as the closest to the preliminary receiver 102. Therefore, step 113 can be reinitiated.

At the end of the procedure, pairs are formed. Each tag device (preliminary transmitter or preliminary receiver) can be associated to a respective known position device (preliminary receiver or preliminary transmitter).

Algorithms can be provided to avoid that one tag device is associated to more than one known position device, and/or that one known position device is associated to more than one tag device. For example, intermediate communications can be performed between the tag devices and/or the known position devices to redefine the pairs.

According to one embodiment, it is provided that known position device can be associated to many tags, but one tag can only be associated with one single known position device.

In some embodiments, instead of determining the closest device, it is possible to determine a device which is within a predetermined distance threshold.

In some embodiments, the preliminary coarse localization procedure can be based on the results of a previous fine localization procedure (e.g., one of those which are discussed below). In that case, it is not needed to perform the measurements above: it is simply possible to rely on previous fine measurements (e.g., performed by PDoA receivers 31-36). Alternatively, the association in pairs between tag devices and known position devices may be communicated, for example, by a master node (such as, for example, the gateway 40).

A pairing between tag device and known position device may be implicitly known if the tag device transmits a wake-up sequence of the closest known position device to initiate a PDoA procedure. In another embodiment, a master node (which could be the gateway 40) could request the ID of the closest known position device only from the tag device, that is to be accurately localized.

In some embodiments it is also possible to configure the known position devices and/or the tag devices (and/or other devices such as a master node, if present) so that the transmissions of the reference signals and tag signals (while overlapping with each other) do not overlap with preliminary transmissions for the coarse localization procedure, or other transmissions. It some examples, there are provided time-triggered solutions, commands from masters, algorithms based on time (even absolute item) of transmissions, or other solutions which permits to avoid such interfering transmissions.

According to some embodiments, during the coarse preliminary procedure, preliminary signals (e.g, transmitted by the preliminary transmitter 101 which can be a tag device or a known position device) which include their ID in a periodic or non-periodic (e.g., commanded by a master) manner, so that the preliminary receivers 102 are able to perform measurements (RSS, RTT, AoA, etc.) and as a result are able to determine the closest known position device. The mentioned ID can be used to at least one of the two following results:

a) Derive a hopping pattern;
b) Derive a wake-up sequence to trigger reference signal transmission later on.

The preliminary coarse localization procedure (which is an association procedure for obtaining a pair of devices) is useful for localization systems that rely on a reference transmitter (e.g. TDOA systems).

5.8. The Fine Localization Procedure

According to the invention, a fine localization may be performed by using both signals transmitted by a tag device and a signal transmitted by a known position device.

5.8.1. A Fine Localization Procedure

FIG. 8 shows a fine localization according to the invention. A tag device 10 transmits a tag signal ("LocalizationSigTx( )") which comprises a preamble 121 ("PreambleTx( )") and a localization frame 122 (which can be a frequency-hopping signal). The preamble 121 may coincide with the wakeup sequence for the known position device (or one of the wakeup sequence that are recognized by the known position device).

After the transmission of the preamble 121, also the known position device 25 (which is in the same pair of the tag device 10) transmits a signal 123 (which can be a frequency-hopping signal) which overlaps at least partially the localization frame 122. Phase information of the signal 123 and the localization frame 122 is detected by the PDoA nodes. Data 124 ("EstimationResult( )") is then transmitted to the controller 50. The controller 50 can therefore obtain a fine position of the tag device 10.

The transmission performed by the tag device 10 may be triggered, according to the embodiments, by a master node (which is this case is the gateway 40) with a request signal 120 ("PositioningRequest( )"). In other embodiments, the tag device may transmit the signals periodically or randomly.

The preamble 121 may, according to embodiments, contain information of the known position device 25, for example, its identifier and/or a wake-up sequence to wake up known position device 25. The fact that the known position device 25 has been chosen by the tag device 10 may be due, for example, to a previous preliminary coarse localization procedure: the tag device 10 (which could have acted as preliminary receiver 102) had identified the known position device 25 (which could have acted as preliminary transmitter 101) as the closest known position device. According to such an embodiment, the tag device 10 would have indicated, in the preamble 121, the known position device 22.

Basically, the known position device 25 has transmitted the reference signal only on demand.

FIG. 10 shows the tag signal (ref. 11') and the reference signal (ref. 21'). In this case, both the signals are frequency-hopping signals (with the same or similar frequencies). Here, the signals can be subdivided into time slots 12. For each time slot, the frequency of the signals is substantially constant (or at least it varies slowly, e.g., its temporal variation is below a predetermined threshold).

FIG. 11 shows the output of a mixer such as the mixer 80 (or mixing diode circuitry 70). A radio frequency component 23' is not further processed. A low frequency component 13' (which has been, for example, filtered) can be used to calculate the position of the tag devices 10 or 11.

The low frequency component 13' contains all information needed (given appropriate frequency step sizes to allow for ambiguity resolution) for baseline length estimation. A major advantage is the very low involved ADC sampling rate. The resulting low frequency signal can be in the order of the frequency offset between tag and reference transmitter (which may be caused by manufacturing variations of the tag and the reference transmitter) or less than 100 kHz. Embodiments based on higher sampling rates may notwithstanding be employed.

According to some embodiments (e.g., where the tag devices 10 and 11 have played the role of the preliminary transmitters 101 and the known position devices 21-26 have played the role of the preliminary receivers 102 during a preliminary coarse localization procedure), the tag device 10 could indicate, in the preamble 121, its own identifier. The known position device 25 (which has the information that the closest tag device 10 is the closest tag device) may therefore identify, in the preamble 121, the identifier of its pair tag device and start to transmit the signal 123 at the end of the preamble 121.

The embodiment of FIG. 8 can also be modified by inverting the tag device 10 with the known position device 25. Accordingly, it is the known position device 25 (which, in some embodiments, could have played the role of the preliminary receiver 102 during a preliminary coarse localization procedure and identified the tag device 10 as the closest preliminary transmitter) that transmits a preamble indicating the identifier of and or a wake-up sequence for the tag device 10, so that the tag device 10 starts transmitting a signal which superposes, at least partially, to the signal transmitted by the known position device 25.

In some embodiments it is also possible to configure the known position devices and/or the tag devices so that the transmissions of the reference signals and tag signals (which overlap with each other) do not overlap with preliminary transmissions for the coarse localization procedure, or other transmissions. Time triggered solutions (e.g., by transmitting determined signals only at some predefined instants) and/or master-slave approaches (e.g., by transmitting determined signals at the reception of master commands) can be used to this purpose.

In some embodiments, a frequency-hopping pattern is predefined. In some other embodiments, the frequency-hopping pattern is obtained by a suitable algorithm which can keep in account the ID number of a device, such as the preliminary transmitter (when the coarse localization procedure has been performed).

5.8.2 A Variant for the Fine Localization Procedure

A variant of the previously disclosed system provides for a known position device 27 which is an arbitrary device positioned at a known location. According to this variant, the known positions devices 21-26 are not present (or, if present, not utilized).

The device 27 may transmit (periodically or randomly) signals 124 independently of any master node of the system 100. The signals 124 may be multicarrier signals, e.g., of the type of LTE, WLAN, etc.

According to one embodiment, the tag device 41 may try to find out the frequency (or one of the frequencies of one of the carriers, or the frequency of the main carrier, or the bands, or one of the bands) of the signals 124 transmitted by the device 27 (and/or transmit a frequency-hopping signal) trying to be in a similar band of the carriers of the signal 124. If the signal transmitted by the tag device 10 or 11 is in the same band of one of the carriers of the signal 124 (for example, the frequencies are within a predetermined threshold), it is possible for the PDoA receivers to obtain a phase information which can be valuably used (e.g., by a controller 50) to determine the position of the tag device.

Notably, according to another variant, a multicarrier signal may also be transmitted by a tag device (which can also be a general-purpose device simply transmitting multicarrier signals). In that case, a frequency-hopping signal may be transmitted by a known position device, which can detect the carriers and try to step-by-step and/or adaptively modify the frequency of the reference signal to the carriers so as to transmit signals which are in the same frequency ranges of the carriers.

In some embodiments, it is sufficient to detect the frequency band that is currently used by WIFI, e.g. channel 3. Based on this information is possible to transmit a frequency hopping signal that also occupies channel 3. With WiFi it can be assume that all subcarriers to be transmitted concurrently, so there will be one close subcarrier. The total bandwidth of the tag frequency hopping signal can be adapted to the WIFI signal.

5.9. Positioning

It is possible to position (ie., obtain the position of, precisely localize) the tag devices on the basis of measurements of phases of the tag signals and the reference signals. The latter are transmitted by known position devices 21-26 and, for example by using trigonometric formulas, it is possible to obtain the distance between the tag devices 10 and 11 and the PDoA receivers.

However, measurements are in general impaired by errors. The phase error may therefore propagate as a position error.

In general terms, some incorrect phase measurements are due to an incorrect clock (which may embodied by clock 64 of FIG. 3 or 4) of the device which transmits the signal (e.g., the tag devices 10 and 11 and the known position devices 21-26). Other errors are due to the clock (which may embodied by clock 64 of FIG. 3 or 4) of one of the PDoA receivers 31-36.

Further, some incorrect phase measurements are due to errors in the path between the device which transmits the signal and the PDoA receivers (e.g., multipath, obstacles, and so on).

The present invention permits, notwithstanding, a minimization of these errors.

With reference to FIG. 12, it is suggested acquiring a phase difference between a first wireless signal (e.g., a tag signal transmitted by one of the tag devices 10 or 11) and a second wireless signal (e.g., a reference signal transmitted by one of the known position devices 31-36) using at least a first and a second PDoA receivers (e.g., chosen between PDoA receivers 31-36). At least one of the first and second signal is subdivided into a first time slot and a second time slot (such as time slots 12 of FIGS. 2, 10, and 11) at different frequencies. The method may comprise:

- acquiring (e.g., by the PDoA receivers 31-36) the first and second signals (step 110');
- for each time slot and for each PDoA receiver (31-36), detecting a first phase difference between the first signal and the second signal (step 120');
- for each time slot, calculating a second phase difference as the difference between the first phase difference at the first PDoA receiver and the first phase difference at the second PDoA receiver (step 130');
- calculating a third phase difference as a difference between the second phase difference of the first time slot and the second phase difference of the second time slot (step 140').

Additionally, the method may be used for a localization method comprising deriving the position of the at least one tag device (10, 11) on the basis of the phase difference of arrival, PDoA, of the tag signal and the reference signal (step 150').

Step 120' may be performed by a controller (such as controller 50) or by the controller 65 of each PDoA receiver. There is calculated the phase difference between a tag signal (e.g., transmitted by a tag device 10 or 11) and a reference signal (e.g., transmitted by a known position device 21-26). This step may end with a list of first phase differences, each of them associated to one PDoA receiver and to a time slot (e.g., time slot 12 in FIGS. 2, 10, and 11).

The clock of each PDoA receiver (and the multipath, as well) tends to introduce the same phase error for both the tag signal and the reference signal. Therefore, the phase difference between the tag signal and the reference signal is free from these errors.

Step 130' may be performed by a controller (such as controller 50), which may, for example, calculate a phase distance (second phase difference) between first differences calculated at step 120' for different PDoA receivers. This step may end with a list of second phase differences, each of them associated to one single time slot (but to multiple PDoA receivers).

The clock of each tag device and each known position device tends to introduce the same phase error for all the PDoA receivers. Therefore, the phase difference between the signals as received by the PDoA receivers are cancelled.

Step 140' may be performed by a controller (such as controller 50), which may, for example, calculate a phase distance (third phase difference) between second differences calculated at step 130' for different time slots. This step may end with values of third phase differences, each of them associated to the signal in general (without distinguishing from the time slots, the PDoA receivers, and tag signal/reference signal).

Accordingly, the measurements are more dependable. Phase errors which would be introduced at certain frequency can therefore be tolerated. Phase difference between the signals as received by the PDoA receivers can be cancelled.

In some embodiments, the order between the first, second, and third phase differences may be modified. For example, the first phase difference could be a difference between the tag signal obtained at a first PDoA receiver and the tag signal obtained at a first PDoA. The phase difference between the tag signal and the device signal could be performed at the second or third difference, and so on. The cancellation of all the clock error, notwithstanding, is maintained.

This positioning procedure may be performed during fine localization procedures such as the ones discussed above.

7. DISCUSSION ON THE INVENTION 7.1 Basics

The invention permits to obtain, inter alia, a low-complexity and energy efficient system concept for localization of energy efficient devices. It may serve as an extension to the localization system, which consists of a gateway, a number of (known position) beacon transmitters and tags, equipped with wake-up receivers, at unknown position. In FIG. 1, an inventive system, which extends existing systems by PDoA measurement nodes (the anchor nodes) and enhanced beacon nodes is depicted. Here (known position) beacon nodes (devices), not only allow for RSS-based localization of the tag devices but also act as reference transmitters for the accurate localization of the tags.

The invention permits to achieve, inter alia, a selection scheme of appropriate reference transmitters and anchor nodes with a very low hardware complexity. Due to a dynamic reference transmitter selection, the near-far problem of reference and tag signal at the anchor nodes is mitigated. The synchronization among multiple PDoA measurement nodes is achieved implicitly, and thus the system setup time and cost are reduced.

To outline the localization procedure in a descriptive manner, it is assumed that tag 1 (ref. num. 10) in FIG. 1 is to be localized. As a prerequisite, the tag is to be associated with the closest beacon.

1. An association procedure may be performed by the tag, by measuring the RSS of all beacons within range (other techniques may be used). Based on the measurements, the closest beacon (or the one that appears to be the closest) may be selected and its ID may be stored by the tag. In the following, this beacon is referred to as reference transmitter. This approach mitigates the near-far problem at the PDoA nodes w.r.t the RSS of the beacon and the tag signal. Due to the close proximity of the two transmitters, the RSS at the PDoA node will be in the same range.
2. For accurate positioning, tag 1 (tag device 10) may be woken up by the gateway upon transmission of the wake-up sequence. It is assumed, that the tag has previously detected the closest beacon, i.e. its reference transmitter (known position device 25). Based on the received beacon ID, the tag may be able to derive the wake-up sequence dedicated to its reference transmitter (known position device 25).
3. After the tag (tag device 10) has transmitted the beacon wake-up sequence, the tag and the beacon transmit the same localization signal concurrently, thus occupying non-orthogonal resources in space and time. Instead of a special wake-up sequence, any preamble could be employed by the tag to trigger the reference signal transmission by the beacon. However the wake-up technology allows for a very power efficient operation of the beacon nodes.

7.2 Signal Structure

The signal considered in the remainder of this text is defined as $$s[k] = \sum_{n=0}^{N} \exp(+j\omega_n(k-nL)) \times rect\left[\frac{k-(n+0.5)L}{L}\right] \quad (1)$$

where L is the number of samples per subcarrier, $\omega_n$ is the angular frequency of the n-th subcarrier and N is the number of subcarriers (see FIG. 10). The rect[•] function is defined as $$rect\left[\frac{k}{L}\right] = \begin{cases} 1 & \text{if } -\frac{L}{2} < k \leq \frac{L}{2} \\ 0 & \text{else} \end{cases} \quad (2)$$

and $\omega_n$ is given by $$\omega_n = 2\pi\left(f_c + f_{step}\left(n - \left\lfloor\frac{N}{2}\right\rfloor\right)\right), \quad (3)$$

where $f_{step}$ is the subcarrier spacing.

The receive signal at the p-th PDoA node (e.g., one of the PDoA receivers 31-36) on the n-th subcarrier is $$x_{pn} = d_{pn}(r_{Rp}, \varphi_{nR})s_n + d_{pn}(r_{Tp}, \varphi_{nT})s_n + w_{pn} \quad (4)$$

where $r_{Rp}$ and $r_{Tp}$ denote the distance from the considered tag and the associated beacon to the PDoA node respectively. The influence of the channel and the transmitter oscillator on the signal phase can be modelled as $$d_{pn}(r, \beta) = \exp\left(j\left(2\pi\frac{r}{\lambda_n} + \beta + \beta_{pn}\right)\right) = e^{j\Theta_{pn}} \quad (5)$$

for the n-th subcarrier, where $\lambda_n$ denotes the wavelength of the passband signal, r is the euclidian distance between transmitter and PDoA node, and $\beta$, $\beta_{pn}$ denote the local oscillator phase of transmitter and PDoA nodes respectively. For the sake of simplicity, multipath propagation effects and noise are not considered here.

The invention is not limited to staircase like signals, but can be used in combination with any frequency hopping signal. However, an advantage of the proposed signal lies in its simplicity if generated by an energy efficient device. No digital modulation is involved, instead a single phase locked loop with a channel spacing of $f_{step}$ suffices. Hopping only to the adjacent channel also greatly reduces settling times of the transmitter loop.

7.3 Receiver Architecture

Both signals are received at the approximate same signal strength and time when applied to a circuitry such as the mixing diode circuitry 70 of FIG. 6.

The inverse Hilbert transform $x_{pn}^{(r)}(t) = \mathcal{H}^{-1}\{x_{pn}(t)\}$ of the signals is now considered, as real valued passband signals are being processed. Using equations (1)-(5), the receive signal at one PDoA node on the n-th frequency step is given by $$x_p^{(r)}(t) = \cos((\omega + \Delta\omega_T)t + \Theta_p^{(R)}) + \cos((\omega + \Delta\omega_R)t + \Theta_p^{(T)}) \quad (6)$$

$$= \frac{1}{2}[e^{j((\omega+\Delta\omega_T)t+\Theta_p^{(R)})} + e^{j((\omega+\Delta\omega_R)t+\Theta_p^{(T)})} + \quad (7)$$

$$e^{-j((\omega+\Delta\omega_T)t+\Theta_p^{(R)})} + e^{-j((\omega+\Delta\omega_R)t+\Theta_p^{(T)})}], \quad (8)$$

where $\Delta\omega_T$ and $\Delta\omega_R$ are the frequency-offset of tag and the reference transmitter respectively. The phase shift introduced by the channel and the local oscillators is denoted $\theta_p^{(R)}$ and $\theta_p^{(T)}$ for the reference transmitter and the tag to the PDoA node respectively. For the sake of clarity n is omitted in this section, i.e. $x_p^{(r)} = x_{np}^{(r)}$, since only a single subcarrier is considered.

The mixing diode shows a nonlinear transfer function and can be approximated with taylor series expansion $$i(t) = \sum_{u=1}^{u=\infty} a_u(x_p^{(r)}(t))^u. \quad (9)$$

Inserting (8) into (9) and limiting the number of terms to two:

$$i(t) = \frac{a_1}{2}\left[e^{j((\omega+\Delta\omega_T)t+\Theta_p^{(R)})} + e^{j((\omega+\Delta\omega_R)t+\Theta_p^{(T)})} + \quad (10)$$

$$e^{-j((\omega+\Delta\omega_T)t+\Theta_p^{(R)})} + e^{-j((\omega+\Delta\omega_R)t+\Theta_p^{(T)})}\right] +$$

$$\frac{a_2}{4}\left[e^{j2((\omega+\Delta\omega_T)t+\Theta_p^{(R)})} + e^{j2((\omega+\Delta\omega_R)t+\Theta_p^{(T)})} + e^{-j2((\omega+\Delta_T)t+\Theta_p^{(R)})} + \quad (11)$$

$$e^{-j2((\omega+\Delta\omega_R)t+\Theta_p^{(T)})} + 2e^{j((\omega+\Delta\omega_T)t+\Theta_p^{(R)}+(\omega+\Delta\omega_R)t+\Theta_p^{(T)})} +$$

$$2e^{-j((\omega+\Delta\omega_T)t+\Theta_p^{(R)}+(\omega+\Delta\omega_R)t+\Theta_p^{(T)})} +$$

$$4 + 2\left(e^{j((\omega+\Delta\omega_T)t+\Theta_p^{(R)}-(\omega+\Delta\omega_R)t-\Theta_p^{(T)})} +$$

$$e^{j((\omega+\Delta\omega_R)t+\Theta_p^{(T)}-(\omega+\Delta\omega_T)t-\Theta_p^{(R)})}\right)\right] + \ldots$$

Equation (10) contains the fundamental frequencies of the receive signal. The components of interest are the following terms of (11):

$$2(e^{j((\omega+\Delta\omega_T)t+\theta_p^{(R)}-(\omega+\Delta\omega_R)t-\theta_p^{(T)})} + e^{j((\omega+\Delta\omega_R)t+\theta_p^{(T)}-(\omega+\Delta\omega_T)t-\theta_p^{(R)})})$$

Therefore, it is obtained:

$$\tilde{x}_{pn}^{(r)}(t) := \frac{a_2}{2}(e^{j((\omega+\Delta\omega_T)t+\Theta_{pn}(\varphi_R)-(\omega+\Delta\omega_R)t-\Theta_{pn}(\varphi_T))} \quad (12)$$

$$+ e^{j((\omega+\Delta\omega_R)t+\Theta_{pn}(\varphi_T)-(\omega+\Delta\omega_T)t-\Theta_{pn}(\varphi_R))}) \quad (13)$$

$$= a_2\cos((\Delta\omega_T - \Delta\omega_R)t + (\Theta_p^{(R)} - \Theta_p^{(R)})) \quad (14)$$

$$= a_2\cos\left((\Delta\omega_T - \Delta\omega_R)t + \left(\frac{\omega_n}{c_0}\Delta r_{RT} + \beta_R - \beta_T\right)\right). \quad (15)$$

As can be seen from equation (15), the unknown initial phase of the p-th receiver cancels out. In FIG. 13, a simplified evaluation of the phase-term in equation (15) without any frequency offset, i.e. $\Delta\omega_T = \Delta\omega_R = 0$, is depicted. The phase difference translates to a change in magnitude. FIG. 13 shows a baseband signal $x_{LP}$ (ref. 162) and of its arccos value (ref. 161) after lowpass filtering.

The processing of DC signals may pose a number of challenges. First of all DC signals are more sensitive to noise compared to phase modulated signals, also a DC bias in the receiver circuit may cause problems. Moreover, if arccos(•) is evaluated, proper scaling is needed.

Due to difficulties involved when dealing with DC signals, it may be advantageous to select different frequencies for reference transmitter and the tag. For a practical implementation it seems already sufficient to rely on the different crystal oscillator frequencies due to manufacturing spread of tag and reference transmitter.

7.4 Algorithms

The algorithms discussed in the following estimate a baseline distance between a tag and the associated reference transmitter by processing the measurement obtained at two PDoA receivers (p=1 and p=2). A estimation of the position w.r.t the reference transmitters is may also be implemented.

7.4.1 Mean Difference

First the baseband receive signal is segmented into single frequency steps, then the carrier phase is estimated for each signal individually by straight-forward correlation.

$$r_{pn}[k] = \Sigma_\tau x_{pn}[k-\tau] s_{NF}[k] \quad (16)$$

where $s_{NF}[k]$ is a complex exponential for frequency $\omega_{NF} = \Delta\omega_T - \Delta\omega_R$. The phaseshift for a single frequency step is given by $$\varphi_p(n) = \arg(r_{pn}[\mathrm{argmax}(r_{pn})]) \quad (17)$$

and the combined measurements may be given by $$\Delta r_{RT} = \frac{\lambda_{step}}{2\pi} \frac{1}{N-1} \times \quad (18)$$

$$\sum_{m+1} ((\varphi_1(m-1) - \varphi_2(m-1)) - (\varphi_1(m) - \varphi_2(m))) \quad (19)$$

$$= \frac{\lambda_{step}}{2\pi(N-1)} \sum_{m+1} \Delta\varphi(m) \quad (20)$$

7.4.2 Linear Regression

These multiple differenced estimates $\Delta\varphi(m)$ are combined in the unwrapped phase vector b.

$$\min_{\varphi_{RT}} \|b - \varphi_{RT} f\|, \quad (21)$$

where f=[1, 2, ..., N] contains the channel indicies. The result is obtained from $$\Delta r_{RT} = \varphi_{RT} \frac{c_0}{\omega_{step}}. \quad (22)$$

7.4.3 Music

For the combined signals between two receivers $$x_n^{dd} = \tilde{x}_{1n} \tilde{x}_{2n}^* \quad (23)$$

may be obtained, where $\tilde{x}_{1n}$ and $\tilde{x}_{2n}$ are the analytic lowpass components observed by two PDoA nodes. In FIG. 13, value $x_n^{dd}$ is depicted as $x_{LP}$ and reference numeral 162.

With the MUSIC approach, the individual frequency components $x_n^{dd}$ are rowwise shifted into matrix $$X_{dd} = [(x_1^{dd})^T, \ldots, (x_N^{dd})^T]^T \in \mathbb{C}^{N \times L}$$

What follows is the MUSIC algorithm, possibly including preprocessing steps of the covariance matrix, e.g. forward-backward averaging. The result is a triple-difference estimate for the phase shift between adjacent frequency in the staircase-like waveform. An estimate for the covariance matrix (assuming zero mean) is given by $$\hat{R} = 1/L X_{dd} X_{dd}^H \quad (24)$$

The steering vector is given by $$a = \left[1, \ldots, e^{-j2\pi N \frac{d}{\lambda_{step}}}\right]^T \quad (25)$$

and the MUSIC pseudo-spectrum is maximized over the baseline length, here denoted d.

7.5 CRLB

In this section, a CRLB for an idealized case is derived, to make a first statement on the quality of the proposed estimators. The analysis is simplified in that no carrier frequency offset and perfect synchronization between reference transmitter and tag is assumed. Moreover both, tag and reference, transmit in a coherent manner, i.e. there are no phase jumps between successive steps so that $\beta_R$ $\beta_T$ stays constant. The discrete ADC signal after mixing and filtering is given by $$y[k] = \tilde{x}_p^{(r)}[k] + \tilde{w}[k] \quad (26)$$

$$= \sum_n \tilde{x}_{pn}^{(r)}[k] + \tilde{w}[k] \quad (27)$$

$$= \sum_n \cos\left(\frac{\omega_n}{c_0}\Delta r_{RT} + \frac{\beta_R - \beta_T}{\Delta\beta}\right) \mathrm{rect}\left[\frac{k-(n+0.5)L}{L}\right] + \tilde{w}[k]. \quad (28)$$

Notably, at each time instant only one element of the sum is non-zero, due to the frequency hopping nature of the transmit signal.

To obtain a lower bound for the range estimate, the likelihood function $$l(\Theta) = \Pi_k \frac{1}{\sqrt{\pi N_0}} \exp -\frac{1}{2} \frac{(y[k] - \tilde{x}_p^{(r)}[k])^2}{\frac{N_0}{2}} \quad (29)$$

is derived w.r.t the parameter of interest $\Delta r_{RT}$. Taking the logarithm gives the log-likelyhood function $$L(\Theta) = \log l(\Theta) \quad (30)$$

$$= K\log\left(\frac{1}{\sqrt{\pi N_0}}\right) - \sum_k \frac{1}{2} \frac{(y[k] - \tilde{x}_p^{(r)}[k])^2}{\frac{N_0}{2}} \quad (31)$$

$$L(\Theta) = -\frac{1}{N_0}\sum_k y[k]^2 + \frac{2}{N_0}\sum_k y[k]\tilde{x}_p^{(r)}[k] - \frac{1}{N_0}\sum_k \tilde{x}_p^{(r)}[k]^2 \quad (32)$$

$$= -\frac{1}{N_0}\sum_k y[k]^2 \quad (33)$$

$$+ \frac{2}{N_0}\sum_k y[k]\sum_n \cos\left(\frac{\omega_n}{c_0}\Delta r_{RT} + \Delta\beta\right)\mathrm{rect}\left[\frac{k-(n+0.5)L}{L}\right] \quad (34)$$

$$- \frac{1}{N_0}\sum_k \sum_n \cos^2\left(\frac{\omega_n}{c_0}\Delta r_{RT} + \Delta\beta\right)\mathrm{rect}\left[\frac{k-(n+0.5)L}{L}\right] \quad (35)$$

Deriving twice w.r.t $\Delta r_{RT}$ gives $$\frac{\partial^2 L(\Theta)}{\partial^2 \Theta} = -\frac{2}{N_0} \sum_k y[k] \sum_n \cos\left(\frac{\omega_n}{c_0}\Delta r_{RT} + \Delta\beta\right)\frac{\omega_n^2}{c_0^2} \times \quad (36)$$

$$rect\left[\frac{k-(n+0.5)L}{L}\right] \quad (37)$$

$$+\frac{2}{N_0} \sum_k \sum_n \cos\left(2\left(\frac{\omega_n}{c_0}\Delta r_{RT} + \Delta\beta\right)\right)\frac{\omega_n^2}{c_0^2} \times \quad (38)$$

$$rect\left[\frac{k-(n+0.5)L}{L}\right] \quad (39)$$

Using equation (28) and calculating the expectation yields $$E\left\{\frac{\partial^2 \tilde{L}(\Theta)}{\partial^2 \Theta}\right\} = -\frac{2}{N_0} \sum_k \sum_n \cos^2\left(\frac{\omega_n}{c_0}\Delta r_{RT} + \Delta\beta\right)\frac{\omega_n^2}{c_0^2} \times \quad (40)$$

$$rect\left[\frac{k-(n+0.5)L}{L}\right] \quad (41)$$

$$+\frac{2}{N_0} \sum_k \sum_n \cos\left(2\left(\frac{\omega_n}{c_0}\Delta r_{RT} + \Delta\beta\right)\right)\frac{\omega_n^2}{c_0^2} \times \quad (42)$$

$$rect\left[\frac{k-(n+0.5)L}{L}\right] \quad (43)$$

$$= -\frac{L}{N_0} \sum_n \left(\frac{\omega_n^2}{c_0^2} - \cos\left(2\frac{\omega_n}{c_0}\Delta r_{RT} + \Delta\beta\right)\frac{\omega_n^2}{c_0^2}\right) \le 0 \quad (44)$$

It can be seen from equation (44) that the variance of the estimate depends of the geometry of reference transmitter, tag and the PDoA nodes. Due to the concurrent transmission of reference and tag in the same frequency band the receive signal is subject to fading just as in the case of multipath channels. If the signal bandwidth and the number of hops is selected appropriately, the sum over the cos(.) terms tends to zero and the estimated becomes independent of the actual geometry. This is desirable to ensure an estimate result, independent of the location of the tag.

FIG. 14 shows results of the discussions above.

7.6. An Embodiment

Measurements may be experimentally carried out. A certain number of carriers (e.g., twenty-five) may be been transmitted from a known position device. A tag device in a unknown position may transmit a stepped frequency sweep signal. For the measurements (by the PDoA receivers) the stepped frequency sweep signal and the closest carrier may be filtered. Further, these filtered values may be multiplied digitally, then filtered at a lowpass filter. The phase of the resulting signals may be detected.

This result is obtained at all the PDoA receivers. In a subsequent step, a difference between the results obtained at all the PDoA receivers is calculated.

An idea is that with multiple PDoA receivers it is possible to obtain a better determination of the position of the tag device.

FIG. 13 shows simulations of:
the stepped frequency sweep signal transmitted by the tag device at a PDoA receiver;
the arccos( ) of said signal.

FIG. 14 shows a performance comparison of different baseline estimation algorithms for various signal to noise ratios 7.7 Some Advantages of Embodiments of the Invention Some of the advantages of embodiments of the invention are herewith listed:
Signaling mechanism for reference transmitter selection;
Mitigation of near-far effects;
Utilization of the same time/frequency resources for reference transmission and tag transmission;
Only triggered (by the tag) transmission of the reference signals reduces radio resource utilization;
If the two signals, the transmissions of the reference and of the tag, are temporally overlapping, a bad oscillator in the PDoA (Phase Difference of Arrival) measurement node has less impact on the positioning accuracy. Example: Assume the two signals would be spaced in time by $T_1$ and the clocks of receiver i and j differ by $\Delta T_{ij}$ in one second, then the time measurement error between the two receivers accumulates to $(T_1 \times \Delta T_{ij})$;
Identically constructed reference transmitters and tags;
Implicit wireless synchronization of the PDoA receiver network;
Low complexity PDoA node;
Utilization of multicarrier signals as "reference signals of opportunity".

8. FURTHER IMPLEMENTATIONS

Although some aspects have been described in the context of an apparatus, these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some examples, at least some of the most important method steps may be executed by such an apparatus.

Depending on certain implementation requirements, examples can be implemented in hardware. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some examples comprise a data carrier having electronically readable control signals, which are capable of cooperating with a programmable computer system, such that one of the methods described herein is performed.

Generally, examples can be implemented as a computer program product with a program code, the program code being operative for performing one of the methods when the computer program product runs on a computer. The program code may for example be stored on a machine readable carrier.

Other examples comprise the computer program for performing one of the methods described herein, stored on a machine readable carrier.

In other words, an example of method is, therefore, a computer program having a program code for performing one of the methods described herein, when the computer program runs on a computer.

A further example of the methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further example of the method is, therefore, a data stream or a sequence of signals representing the computer program for performing one of the methods described herein. The data stream or the sequence of signals may for example be configured to be transferred via a data communication connection, for example via the Internet.

A further example comprises a processing means, for example a computer, or a programmable logic device, configured to or adapted to perform one of the methods described herein.

A further example comprises a computer having installed thereon the computer program for performing one of the methods described herein.

A further example comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some examples, a programmable logic device (for example a field programmable gate array) may be used to perform some or all of the functionalities of the methods described herein. In some examples, a field programmable gate array may cooperate with a microprocessor in order to perform one of the methods described herein. Generally, the methods are performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware.

The methods described herein may be performed using a hardware apparatus, or using a computer, or using a combination of a hardware apparatus and a computer.

The methods described herein, or any components of the apparatus described herein, may be performed at least partially by hardware.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

9. REFERENCES

[US 20140378161 A1] Method for synchronizing time measurements carried out in a radio communication network for geolocation purposes
[U.S. Pat. No. 8,233,457 B1] Synchronization-free station locator in wireless network
[US 20110006942 A1] Circuit and method for distance measurement between two nodes of a radio network
[DE102006059623 B3] METHOD AND SYSTEM FOR POSITION DETERMINATION VERFAHREN UND SYSTEM ZUR POSITIONSBESTIMMUNG PROCEDE ET SYSTEME DE DETERMINATION D'UNE POSITION
[1] Joint Node Localization and Time-Varying Clock Synchronization in Wireless Sensor Networks (2013, Aitzaz Ahmad)
[2] Localization by Superposing Beats: First Laboratory Experiments and Theoretical Analyzes (2008, Matthias Schneider, University of Rostock)

The invention claimed is:

1. A system for the localization of at least one tag device, the system comprising:
the at least one tag device configured to transmit a tag signal;
at least one known position device configured to transmit a reference signal; and
a localization device configured to localize the at least one tag device based on the phase difference of arrival (PDoA) between the tag signal and the reference signal,
wherein at least one of the tag signal and the reference signal is a frequency-hopping signal.

2. The system of claim 1, wherein one of the known position device and tag device is configured to transmit a multicarrier signal, wherein the other device is configured to transmit a frequency-hopping signal and/or a signal which is adapted to the carriers of the multicarrier signal.

3. The system of claim 1, wherein the at least one known position device is configured to transmit a reference signal at the reception of a tag signal transmitted by the at least one tag device.

4. The system of claim 1, wherein at least one between the at least one tag device and the at least one known position device is a wake-up node.

5. The system of claim 1, wherein the at least one known position device comprises a plurality of known position devices, the at least one tag device being subjected to be associated to one of the plurality of known position devices.

6. The system of claim 5, wherein the association between the at least one tag device and the known position device is based on distance determinations acquired during a preliminary coarse procedure and/or a previous procedure.

7. The system of claim 1, wherein at least one of the tag device and the known position device is a wake-up device, and its transmission is triggered by the reception of the preamble of a signal transmitted by another device.

8. The system of claim 7, wherein the preamble comprises the identifier of the other device.

9. The system claim 8, wherein the identifier is acquired during a preliminary and/or previous procedure.

10. The system of claim 1, wherein the localization device comprises a plurality of PDoA receivers distributed in different locations.

11. The system of claim 10, wherein the receiving device is configured so as to:
calculate first phase differences;
calculate second phase differences as differences between two first phase differences; and
calculate third phase differences as differences between two second phase differences,
wherein one of said phase differences is performed between a value associated to a tag signal and a value associated to a reference signal;
another one of said phase differences is performed between values associated to different PDoA receivers;
another one of said phase differences is performed between values associated to different time slots.

12. A system for the localization of at least one tag device, the system comprising:
- the at least one tag device configured to transmit a tag signal;
- at least one known position device configured to transmit a reference signal, wherein the at least one known position device is configured to transmit a reference signal at the reception of a tag signal transmitted by the at least one tag device so that the tag signal and the reference signal overlap at least partially; and
- a localization device configured to localize the at least one tag device,
- wherein the system is configured so as to associate the at least one tag device to one of the at least one known position device on the basis of distance determinations between the at least one tag device and each of the of known position devices.

13. The system of claim 12, wherein one of the known position device and tag device is configured to transmit a multicarrier signal, wherein the other device is configured to transmit a frequency-hopping signal and/or a signal which is adapted to the carriers of the multicarrier signal.

14. The system of claim 12, wherein the at least one known position device is configured to transmit a reference signal at the reception of a tag signal transmitted by the at least one tag device.

15. The system of claim 12, wherein at least one between the at least one tag device and the at least one known position device is a wake-up node.

16. The system of claim 12, wherein the at least one known position device comprises a plurality of known position devices, the at least one tag device being subjected to be associated to one of the plurality of known position devices.

17. The system of claim 16, wherein the association between the at least one tag device and the known position device is based on distance determinations acquired during a preliminary coarse procedure and/or a previous procedure.

18. The system of claim 12, wherein the distance determinations are received signal strength (RSS) measurements.

19. The system of claim 12, wherein at least one of the tag device and the known position device is a wake-up device, and its transmission is triggered by the reception of the preamble of a signal transmitted by another device.

20. The system of claim 19, wherein the preamble comprises the identifier of the other device.

21. The system claim 20, wherein the identifier is acquired during a preliminary and/or previous procedure.

22. The system of claim 12, wherein the localization device comprises a plurality of phase difference of arrival (PDoA) receivers distributed in different locations.

23. The system of claim 22, wherein the receiving device is configured so as to:
- calculate first phase differences;
- calculate second phase differences as differences between two first phase differences; and
- calculate third phase differences as differences between two second phase differences,
- wherein one of said phase differences is performed between a value associated to a tag signal and a value associated to a reference signal;
- another one of said phase differences is performed between values associated to different PDoA receivers;
- another one of said phase differences is performed between values associated to different time slots.

24. A method for acquiring a phase difference between a first wireless and a second wireless signals using at least a first and a second PDoA receivers, wherein at least one of the first and second signals is subdivided into a first time slot and a second time slot at different frequencies, the method comprising:
- calculating first phase differences;
- calculating second phase differences as a differences between two first phase differences; and
- calculating third phase differences as differences between two second phase differences,
- wherein one of said phase differences is performed between values associated to different wireless signals;
- another one of said phase differences is performed between values associated to different PDoA receivers;
- another one of said phase differences is performed between values associated to different time slots.

25. The method of claim 24, comprising:
- for each time slot and for each PDoA receiver, detecting a first phase difference between the first signal and the second signal;
- for each time slot, calculating a second phase difference as the difference between the first phase difference at the first PDoA receiver and the first phase difference at the second PDoA receiver;
- calculating a third phase difference as a difference between the second phase difference of the first time slot and the second phase difference of the second time slot.

26. A method for localizing at least one tag device using the method for acquiring a phase difference between a first wireless and a second wireless signals using at least a first and a second PDoA receivers, wherein at least one of the first and second signals is subdivided into a first time slot and a second time slot at different frequencies, the method comprising:
- calculating first phase differences;
- calculating second phase differences as a differences between two first phase differences; and
- calculating third phase differences as differences between two second phase differences,
- wherein one of said phase differences is performed between values associated to different wireless signals;
- another one of said phase differences is performed between values associated to different PDoA receivers;
- another one of said phase differences is performed between values associated to different time slots,
wherein the first wireless signal is transmitted by the tag device and the second wireless signal is transmitted by a known position device,
further comprising deriving the position of the at least one tag device on the basis of the third phase difference.

27. A method for localizing at least one tag device, the method comprising:
- transmitting, by the tag device, a tag signal;
- transmitting, by at least one known position device, a reference signal; and
- deriving the position of the at least one tag device on the basis of the phase difference of arrival (PDoA) between the tag signal and the reference signal,
- wherein at least one of the tag signal and the reference signal is a frequency-hopping signal.

28. A method for localizing at least one tag device in a system comprising a plurality of known position devices, the method comprising:
- associating the at least one tag device to one of the at least one known position device on the basis of distance determinations between the at least one tag device and each of the of known position devices;

transmitting a tag signal from the at least one tag device;
transmitting a reference signal from at least one known position device, wherein the reference signal is transmitted at the reception, by the known position device, of the tag signal device, and the tag signal and the reference signal overlap at least partially; and
deriving the position of the at least one tag device on the basis of the tag signal and the reference signal.

29. A non-transitory digital storage medium having a computer program stored thereon to perform the method for acquiring a phase difference between a first wireless and a second wireless signals using at least a first and a second PDoA receivers, wherein at least one of the first and second signals is subdivided into a first time slot and a second time slot at different frequencies, the method comprising:
    calculating first phase differences;
    calculating second phase differences as a differences between two first phase differences; and
    calculating third phase differences as differences between two second phase differences,
    wherein one of said phase differences is performed between values associated to different wireless signals;
    another one of said phase differences is performed between values associated to different PDoA receivers;
    another one of said phase differences is performed between values associated to different time slots,
when said computer program is run by a computer.

30. A non-transitory digital storage medium having a computer program stored thereon to perform the method for localizing at least one tag device using the method for acquiring a phase difference between a first wireless and a second wireless signals using at least a first and a second PDoA receivers, wherein at least one of the first and second signals is subdivided into a first time slot and a second time slot at different frequencies, the method comprising:
    calculating first phase differences;
    calculating second phase differences as a differences between two first phase differences; and
    calculating third phase differences as differences between two second phase differences,
    wherein one of said phase differences is performed between values associated to different wireless signals;
    another one of said phase differences is performed between values associated to different PDoA receivers;
    another one of said phase differences is performed between values associated to different time slots,
wherein the first wireless signal is transmitted by the tag device and the second wireless signal is transmitted by a known position device,
further comprising deriving the position of the at least one tag device on the basis of the third phase difference,
when said computer program is run by a computer.

31. A non-transitory digital storage medium having a computer program stored thereon to perform the method for localizing at least one tag device, the method comprising:
    transmitting, by the tag device, a tag signal;
    transmitting, by at least one known position device, a reference signal; and
    deriving the position of the at least one tag device on the basis of the phase difference of arrival (PDoA) between the tag signal and the reference signal,
    wherein at least one of the tag signal and the reference signal is a frequency-hopping signal,
when said computer program is run by a computer.

32. A non-transitory digital storage medium having a computer program stored thereon to perform the method for localizing at least one tag device in a system comprising a plurality of known position devices, the method comprising:
    associating the at least one tag device to one of the at least one known position device on the basis of distance determinations between the at least one tag device and each of the of known position devices;
    transmitting a tag signal from the at least one tag device;
    transmitting a reference signal from at least one known position wherein the reference signal is transmitted at the reception, by the known position device, of the tag signal device, and the tag signal and the reference signal overlap at least partially; and
    deriving the position of the at least one tag device on the basis of the tag signal and the reference signal,
when said computer program is run by a computer.

* * * * *